(12) United States Patent
Rehberg

(10) Patent No.: US 8,180,629 B2
(45) Date of Patent: May 15, 2012

(54) AUTOMATIC PATTERN GENERATION IN NATURAL LANGUAGE PROCESSING

(75) Inventor: Charles Patrick Rehberg, Nashua, NH (US)

(73) Assignee: Trigent Softward Ltd., Bangalore (IN)

( * ) Notice: Subject to any disclaimer, the term of this patent is extended or adjusted under 35 U.S.C. 154(b) by 978 days.

(21) Appl. No.: 12/170,433

(22) Filed: Jul. 10, 2008

(65) Prior Publication Data
US 2010/0010800 A1    Jan. 14, 2010

(51) Int. Cl.
*G06F 17/27* (2006.01)
(52) U.S. Cl. .................. 704/9; 704/257; 704/10
(58) Field of Classification Search .......... 704/1–10, 704/270, 270.1, 251, 257, 255, 272, 274
See application file for complete search history.

(56) References Cited

U.S. PATENT DOCUMENTS 7,346,490 B2 *   3/2008   Fass et al. .................... 704/7
7,962,326 B2 *   6/2011   Tsourikov et al. ............ 704/9

* cited by examiner

*Primary Examiner* — Huyen X. Vo
(74) *Attorney, Agent, or Firm* — Ash Tankha; Lipton, Weinberger & Husick

(57) ABSTRACT

Disclosed herein is a computer implemented method and system of generating declared patterns from components of a sentence. Parts of speech in the sentence are tagged for identifying parts of speech of each word and phrase in the sentence. Sentence chunking is then performed using the identified parts of speech of each word and phrase to generate pattern units. A first dictionary and a database of equivalent pattern specification sets are then applied to identify grammatical roles and senses of the generated pattern units. A second dictionary and a conceptionary are then applied to identify an equivalent name set for each of the generated pattern units. The declared patterns are then generated for the sentence using the identified equivalent name set for each of the generated pattern units.

12 Claims, 22 Drawing Sheets

AUTOMATIC PATTERN GENERATION IN NATURAL LANGUAGE PROCESSING

BACKGROUND

This invention, in general, relates to a method of linguistic analysis and in particular relates to a method of determining the appropriate sense of words used in a sentence.

There is an unmet need using a computer implemented system to adequately identify the appropriate senses of words used in a sentence. For example, consider the two sentences "the table ate the pie" and "the dog ate the pie". Linguistically, a subject verb object organization exists in both the sentences. Linguistically both sentences are correct, however semantically the first sentence does not make sense. There is a need for a computer implemented method and system to determine the correct correspondence of the senses of the terms used in a sentence.

Effective information retrieval requires a strong understanding of the content of the underlying information, i.e., the components of the sentences comprising the information. There exists a need for a system to improve information search and retrieval based on an understanding of the components of a sentence.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

Disclosed herein is a computer implemented method and system for generating declared patterns from components of a sentence. A pattern derived from a sentence is herein referred to as a "declared pattern". The computer implemented method and system disclosed herein automatically generates declared patterns (DP) from the components of a sentence. A declared pattern is a sequence of pattern units, each of which corresponds to a portion of text in the sentence. The method and system of automatic generation of declared patterns employ the following units: a conceptionary, a parts of speech tagger database, a dictionary extended with declared and emergent categories, herein referred to as a "first dictionary", where emergent semantic categories determine which sense of the word is valid in the sentence. Other components employed in the system disclosed herein are the following: a database of equivalent pattern specification sets that, for a given language, represent different ways of saying the same thing, and a second dictionary of an equivalent name set which is used to identify the equivalent senses for each pattern unit. The equivalent name set refers to a set of senses which can be considered to have the same meaning.

For each sentence in a document corpus, the parts of speech tagger database is used to tag the sentence in terms of the parts of speech. The method of parts of speech tagging identifies the parts of speech of each word and phrase in the sentence. Sentence chunking is performed using the identified parts of speech of each word and phrase to generate pattern units. The first dictionary with emergent categories, together with database of the equivalent pattern specification sets is then applied to determine the grammatical roles and the senses of the generated pattern units. The second dictionary and conceptionary are used to identify the equivalent name sets for the generated pattern units. A declared pattern is generated by identifying a valid combination of the generated pattern units.

Automatically generated declared patterns together with reading styles may be applied in automated keyword search string refinement applications.

Automatically generated declared patterns may be used to enhance the reading style of a user. As used herein, a user's reading style is a formal mapping of sentence structure and content to their conceptionary. Worldview of the user comprises the reading style, equivalent name sets and private ontology, i.e. conceptionary of the user. The worldview reflects the logic and structure with which a user comprehends a document. Indian patent application No. 1819/CHE/2005 filed in the Indian patent office on Dec. 13, 2005, and its counterpart U.S. patent application Ser. No. 11/451,198, which is herein incorporated in its entirety by reference illustrates a method of capturing the reading style of a user, wherein the reading style is a set of one or more declared patterns.

The computer implemented method and system disclosed herein enhances the reading style. The reading style can be applied in determining the information of interest from the document corpus in a target language.

The computer implemented method and system disclosed herein determines equivalent terms of the components of a given sentence. These equivalent terms may be used to broaden the search criteria in an information retrieval process and may be used to provide a more comprehensive set of results. In the computer method and system disclosed herein, the equivalent terms are called pattern units and when these pattern units occur in predefined strings, the pattern units are called a declared pattern.

The computer implemented method and system disclosed herein can be used to create reading styles and conceptionary on the fly, which can be applied to the discovery of content and the relationships within contents.

BRIEF DESCRIPTION OF DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

DETAILED DESCRIPTION OF THE INVENTION

Figure 1A:
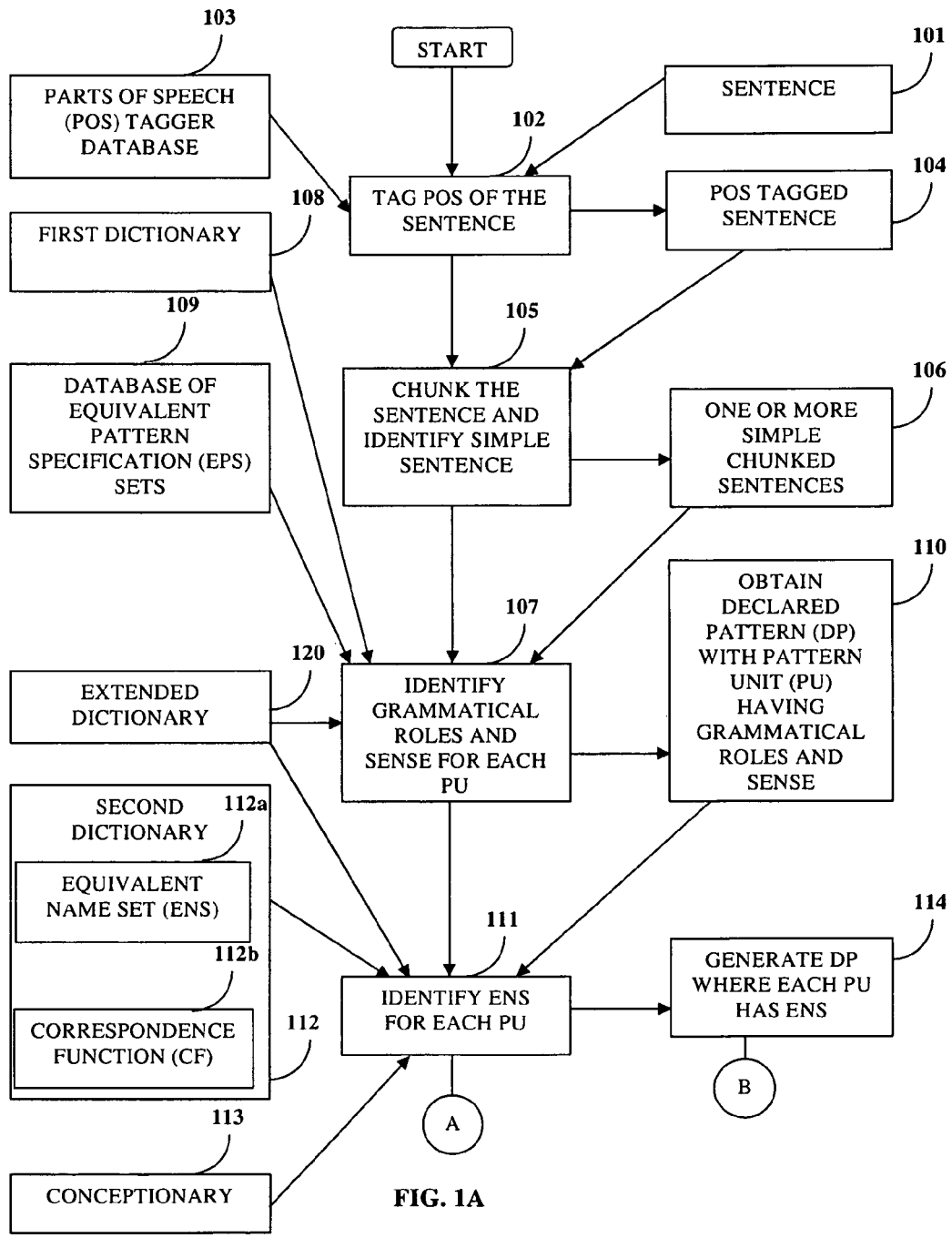
FIGS. 1A-1B illustrate a computer implemented method of generating declared patterns from components of a sentence.

The definitions of the technical terms used herein are provided below.

Declared pattern (DP): A declared pattern is a sequence of pattern units, each of which corresponds to a portion of text in the sentence. A declared pattern is a mapping between natural language grammar and semantic items in the conceptionary.

Pattern unit (PU): A pattern is a relative sequence of pattern units. A pattern unit is a mapping between a role in a sentence and its equivalent name set.

Conceptionary: A conceptionary is a language independent representation of ontology. The conceptionary is a knowledge representation of items. The items represent concepts, instances, relationships of different kinds, characteristics, values, units of measure, and sets and aggregations of these items.

Reading style: The reading style is a set of one or more declared patterns. A declared pattern contains a set of source components. A pattern identifies a specific semantic item. The user declares patterns from source components and thereby captures the reading style. There are different kinds of source components such as sentences, paragraphs, etc.

Worldview: The worldview of the user comprises the reading style, ENS repository, reading plan, and private ontology, i.e. the conceptionary of the user. The worldview reflects the logic and structure with which a user comprehends a document.

Semantic item: A semantic item is one of the following: a thing, a type of thing, a characteristic, or a relationship between things and types of things. The conceptionary comprises semantic items.

Equivalent name set (ENS): Identifies a set of senses for words which mean the same and also provides a set of words that have the same meaning for a given language. For a given language, each semantic item maps to a single ENS. The ENS contains multiple items, i.e., multiple entries.

ENS category: An ENS Category identifies a set of one or more ENS.

Equivalent pattern specification (EPS) sets: Sets of equivalent pattern specifications that for a given language represent different ways of saying the same thing. An equivalent pattern (EP) is a sequence of pattern units (PU). A PU specifies the linguistic metadata needed to match a term in a language. Each of the EPS sets is a set of EP where each EP represents grammatically different ways that possibly represent the same semantics. The EP in an EPS comprises the same number of PU representing an occurrence of an ENS. Each EPS includes a meaning map that describes a single semantic pattern involving one or more of the PU in the EP.

Emergent categories: Emergent semantic categories are used to determine which sense of the word or phrase is valid in the sentence relative to other words or phrases of a sentence.

Correspondence function (CF): Identifies a relationship between two senses, where the relationship includes a linguistic correspondence. A CF identifies a correspondence involving two ENS each with a different linguistic role. The linguistic roles include subject, transitive verb, intransitive verb, linking verb, direct object, indirect object, etc. A CF asserts that when each ENS fills the identified linguistic roles, that combination of ENS is considered to be semantically valid.

Meaning maps: A meaning map is a set of meaning map units (MMU) that establishes a correspondence between PU and semantic item types (SIT) in the conceptionary. Each MMU establishes a part of the semantic representation in terms of SIT one or more of the PU in the EP.

Parts of speech tagger: parts of speech tagger is a unit that determines the part of speech of the different terms of a sentence as subject, verb, object etc.

Figure 1B:
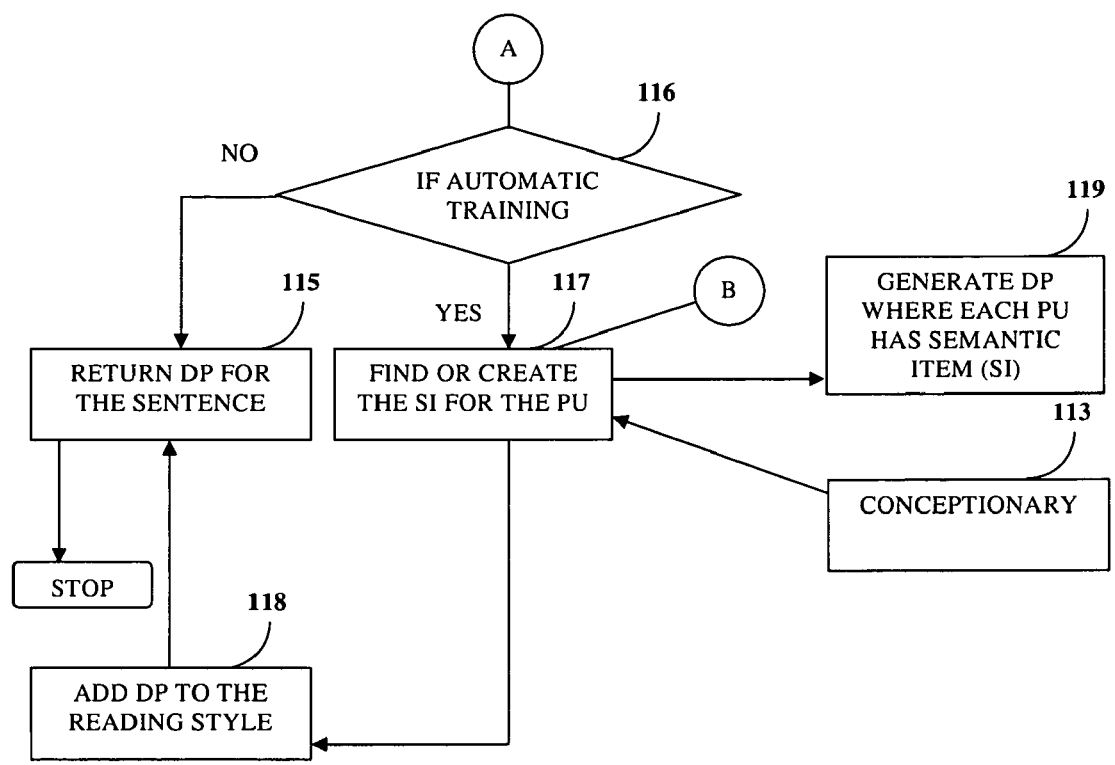

FIGS. 1A-1B illustrates a computer implemented method of generating declared patterns from components of a sentence 101. The method disclosed herein provides a confectionary 113, a parts of speech (POS) tagger database 103, a first dictionary 108 comprising declared categories and emergent categories, a database 109 comprising equivalent pattern specification (EPS) sets, and a second dictionary 112 comprising an equivalent name set (ENS) 112a. The conceptionary 113 is a knowledge representation of items. The items represent concepts, instances, relationships of different kinds, characteristics, values, units of measure, and sets and aggregations of these items. Reference is made to the co-pending patent application Ser. No. 11/451,198 titled "Capturing Reading Style," filed Jun. 10, 2006, wherein conceptionary 113 is also defined as a library that contains information on how words or phrases in one or more given languages are related to concepts. As used herein, the term "concept" means a general idea derived from specific instances. "types of things" and "concepts" are equivalent terms used in the description.

The POS tagger database 103 may be a readily available off-the-shelf POS database 103. The sentence 101 from a document corpus is provided as input to the POS tagger 1001. The POS 613 in the sentence 101 are tagged 102 for identifying POS 613 of each word 607 and phrase in the sentence 101. Each term in the POS tagged sentence 104 is tagged with the term's part of speech. The POS tagged sentence 104 is given as input for sentence chunking 105.

Figure 3:
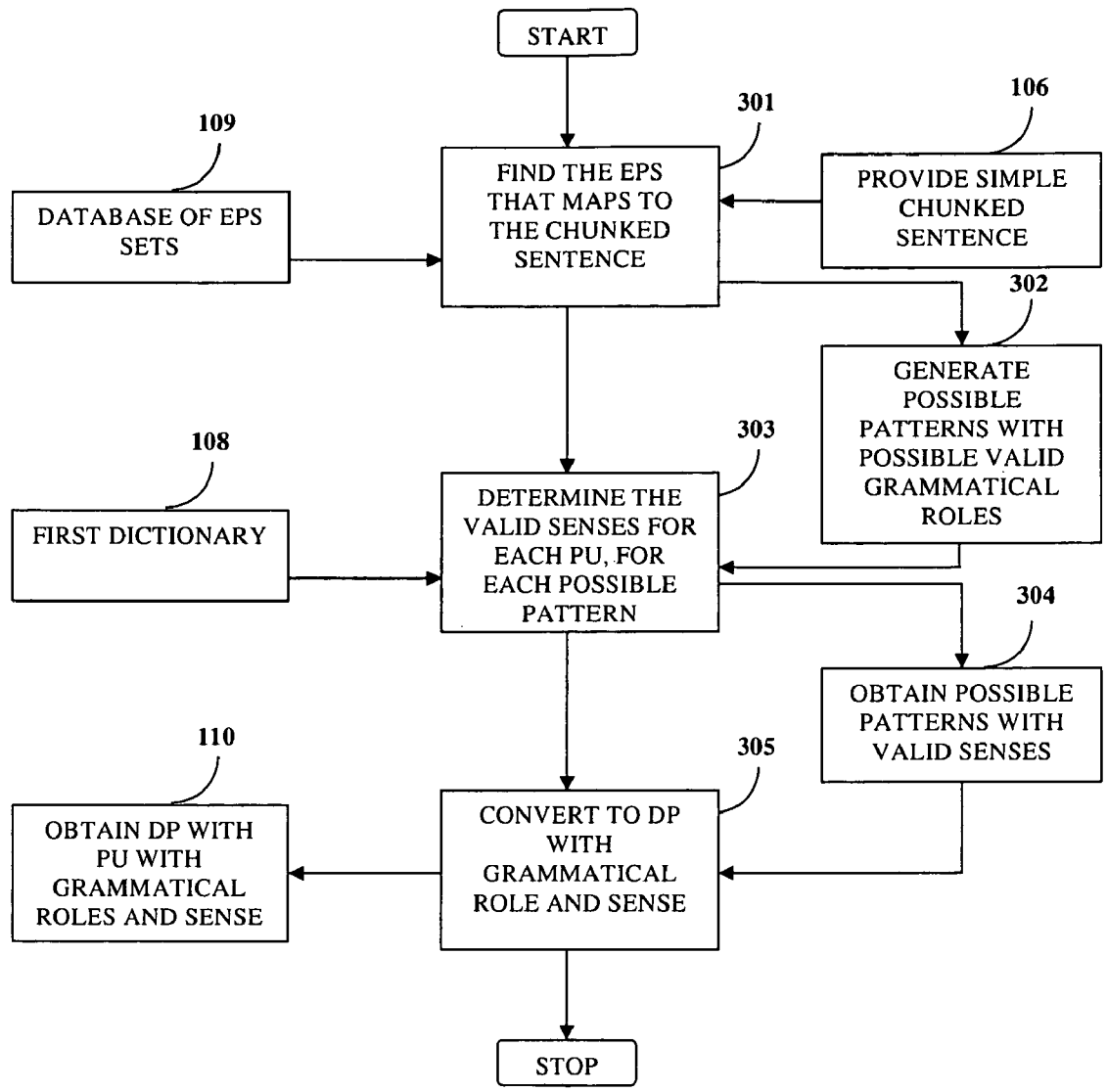
FIG. 3 exemplarily illustrates a method of identifying grammatical roles and senses of pattern units.

The POS tagged sentence 104 is then chunked 105 using the identified POS 613 of each word 607 and phrase to generate pattern units. Consider the example: "Joe and Bob bought a Mercedes". The sentence 101 is identified as a complex sentence and can be chunked into the following two simple sentences: Joe bought a Mercedes and Bob bought a Mercedes. "Joe bought a Mercedes" is chunked as Joe bought Mercedes=>(Noun Phrase) (Verb Phrase) (Noun Phrase), and "Bob bought a Mercedes" is chunked as=>(Noun Phrase) (Verb Phrase) (Noun Phrase). The output of chunking is one or more simple chunked sentences 106. Sentence chunking occurs as an iterative process where the number of iterations depends on the extent up to which the sentence 101 can be simplified. For example, in the sentence 101 "Joe wished he went to California", "Joe wished" is chunked as '(Noun Phrase) (Verb Phrase)' and "he went to California" is a sentential compliment. Next "he went to California" is chunked to (Noun Phrase) (Verb Phrase) (Noun Phrase). Each constituent of a simple chunked sentence becomes a potential pattern unit (PU) 804 in a declared pattern (DP) 710. After a PU 804 is generated, the grammatical role and sense 621 for each PU 804 is identified 107. Identification of the grammatical roles and senses of the PU 804 is illustrated in FIG. 3.

The sense 621 of a word 607 is the meaning of the word 607 as applicable to the context in which the word 607 is used in the sentence 101. For example consider the sentence 101: "Joe ran for the office". The word 607 "ran" may have forty different senses. In the above sentence 101, "ran" have two different senses, either hurried or campaigned. i.e. "Joe hurried to the office" or "Joe campaigned for the office". The context or the environment in which the word 607 is used in the sentence 101 determines the sense 621 of the word 607. The first dictionary 108 and a database 109 of EPS sets are applied to identify 107 grammatical roles and senses of the generated pattern units. The first dictionary 108 comprises dictionary entries of words and phrases. Each of the dictionary entries is a term composed of single words and phrases and specifies individual senses of the term.

An extended dictionary 120 is a database containing terms that are words and phrases with an associated list of senses, where each sense 621 includes a definition and a set of categories, where some categories are declared categories such as POS 613, and some categories are emergent categories. The emergent categories describe how senses associate with other senses. Emergent categories constrain the sense 621 of a PU 804 in a given sentence 101, i.e., emergent categories limit the various senses of a word 607 to only those senses that are appropriate in the given context. For example, consider the sentence 101: "peel the orange". In the above example, the emergent category identifies correspondence between words, and identifies valid sense pairings, and is used to determine the sense 621 of the word 607 "orange", as used herein is a fruit and not a color. Emergent semantic categories are used to determine which sense 621 of the term is valid in the sentence 101.

For example consider the following two sentences:
Sentence 1: Joe runs for the bus.
Sentence 2: Joe runs for the office.

Both of the above sentences have the same linguistic pattern, i.e., the subject verb object pattern. However the emergent semantic categories will determine which senses of the words in the above sentences correctly correspond to one another.

As another example, consider the sentence 101: "Joe ran a company". In this sentence 101, the sense 621 of the words needs to be determined and the relationship 206 between the senses clearly established using emergent semantic categories. For example, the word 607 "ran" in the sense 621 of management must be related to "leading", in the sentence 101 wherein the word 607 "company" is used in the sense 621 of an organization. This correspondence of senses is indicated by the emergent categories.

Figure 6A:
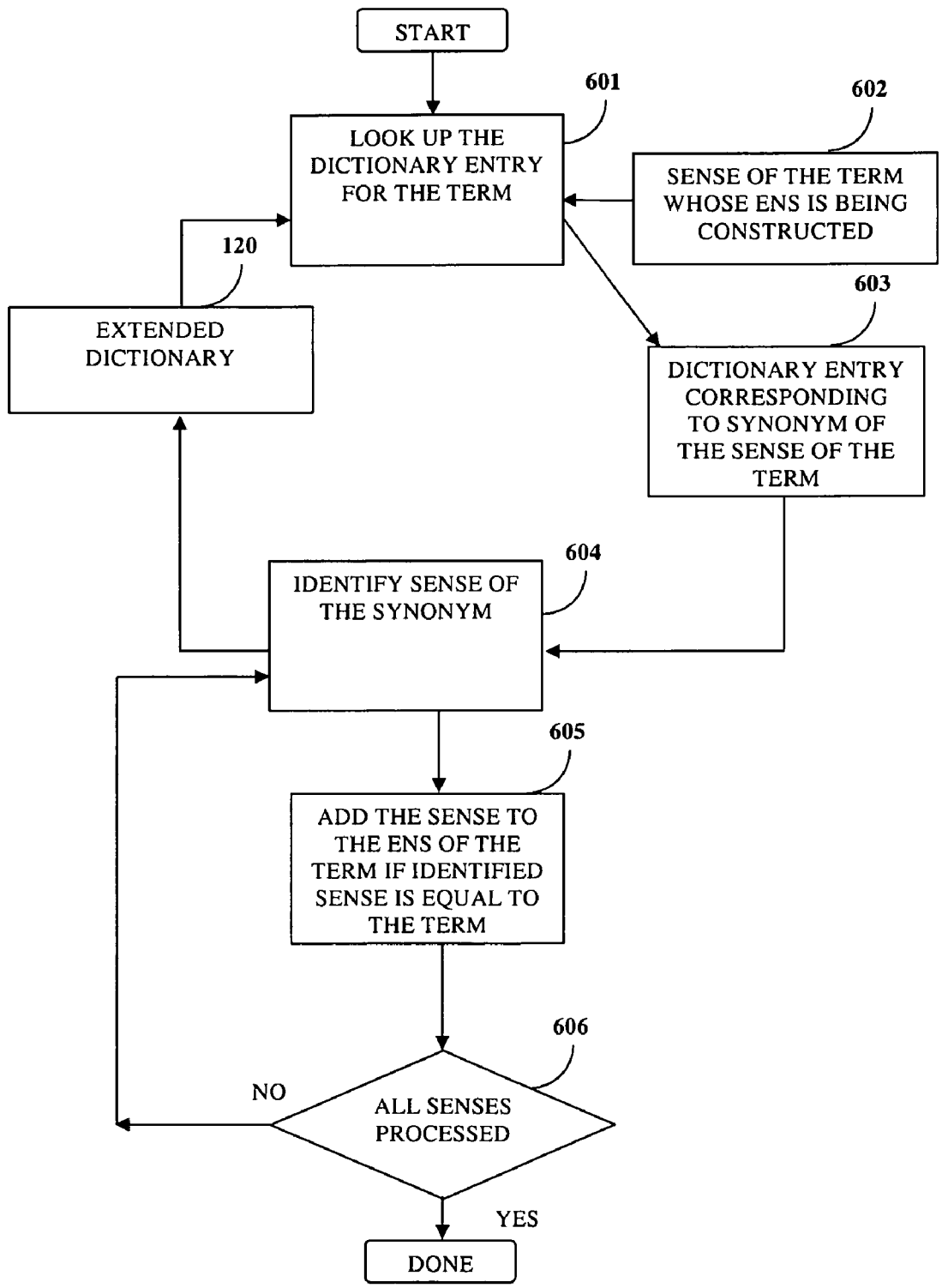
FIG. 6A exemplarily illustrates a method of identifying equivalent name sets for senses.

The EPS sets 701 provide mappings of the grammatical roles of the simple chunked sentences 106. The mappings are checked against the EC to find valid corresponding senses of the pattern units. After the sense 621 and grammatical role of each pattern unit PU 804 has been identified, PU 804 with their identified grammatical role and senses are obtained 110. The second dictionary 112 and a conceptionary 113 are then applied to identify 111 an ENS 112a for each of the generated pattern units. The ENS 112a is a set of words that have same meaning. If ENS 112a for some sense 621 does not exist, then ENS 112a for that sense 621 is constructed. A method of identifying the ENS 112a is illustrated in FIG. 6A.

Declared patterns with identified grammatical role and senses 110 are generated 114 using the identified ENS 112a for each of the generated pattern units.

A DP 710 is a mapping between natural language grammar and semantic items in the conceptionary 113. The semantic item 201 for the PU 804 is found or created 117 if there is a DP 710 with each PU 804 comprising an ENS 112a. The ENS 112a maps a concept 202 to an equivalent term. The DP 710 is returned 115 to a user as the derived DP 710 for the inputted sentence. The DP 710 provides a sequence that is used to map to a set of semantic items in a conceptionary 113, if the DP 710 is found in the sentence 101. The mapping is defined by meaning maps. There is a need to identify the semantic item 201 for the ENS 112a. The conceptionary 113 is looked up based on the meaning maps, and on the basis of the structure of the PU 804, the ENS 112a found is mapped to the semantic item 201 in the conceptionary 113.

For each of the generated pattern units, the ENS 112a is obtained and further whether or not a matching semantic item 201 with the ENS 112a exists for the given language 618 in the conceptionary 113 is determined. The DP 710 is determined if some or all the PU 804 include semantic items. If there are no pattern units with semantic items, then new semantic items for pattern units are created. Further, the new semantic item 201 is added to the conceptionary 113. The new semantic item 201 is then related to other semantic items in the conceptionary 113 via relationships indicated between the generated pattern units in the declared patterns.

If automatic training is not implemented, then return the DP 710 with or without the missing semantic item 201 for the PU 804. If automatic training is implemented, check if there are any missing semantic items. Test if there are declared patterns where some or all pattern units have semantic items. If some or all pattern units have semantic items, then create semantic items for the PU 804. Derive declared patterns where all pattern units have semantic items. Add the DP 710 to the reading style.

The method of deriving declared patterns may further include the step of automatic training 116. The step of automatic training 116 enables addition of the sense 621 of new words to ENS 112a, addition of new semantic item 201 in the conceptionary 113 and the update of the reading style. Automatic training therefore updates the conceptionary 113 and the reading style. For a new pattern unit, a semantic item 201 is created 117, if not found in the conceptionary 113. The semantic item 201 is then added to the conceptionary 113 referencing the identified ENS 112a for each pattern unit, if the identified ENS 112a is not already referenced in the conceptionary 113.

A DP 710 is generated 119 and the conceptionary 113 is updated based on this DP 710, where each PU 804 includes the semantic item 201. The semantic item 201 is one of the following: a thing 203, a type of thing 204, a characteristic 210, or a relationship 206 between things and types of things. Declared patterns with new semantic items are added 118 to the conceptionary 113 and reading style. For example, if the user performing training comes across the sentence 101: "He is a fly guy". If the meaning (i.e. sense) of the term "fly guy" (meaning a "cool guy") is not represented as a concept 202 in the conceptionary 113, although the concepts representing "fly" and "guy" individually are, the new concept "fly guy" gets added to the conceptionary 113.

The reading style is a set of one or more declared patterns. The DP 710 contains a set of source components. The DP 710 identifies a specific semantic item 201. The user declares patterns from source components and thereby captures the reading style. There are different kinds of source components such as sentences, paragraphs, etc. The process of capturing and applying the reading style includes the following activities: capturing and applying the reading style of the user, creating a worldview of the user using the reading style, applying the worldview to a document corpus, determining the information of interest, and displaying the desired information to the user in the form of a report. The worldview of the user is constructed from the reading style, reading plan and private ontology of the user. Optionally, the user can choose to include a predetermined external ontology to create the worldview. Co-pending U.S. application Ser. No. 11/451, 239 titled "Pattern Generation" generates equivalent patterns that include the manifestations of the DP 710 of an end user's reading style, thereby providing the ability to comprehensively and accurately determine the information of interest from an information source.

Figure 2A:
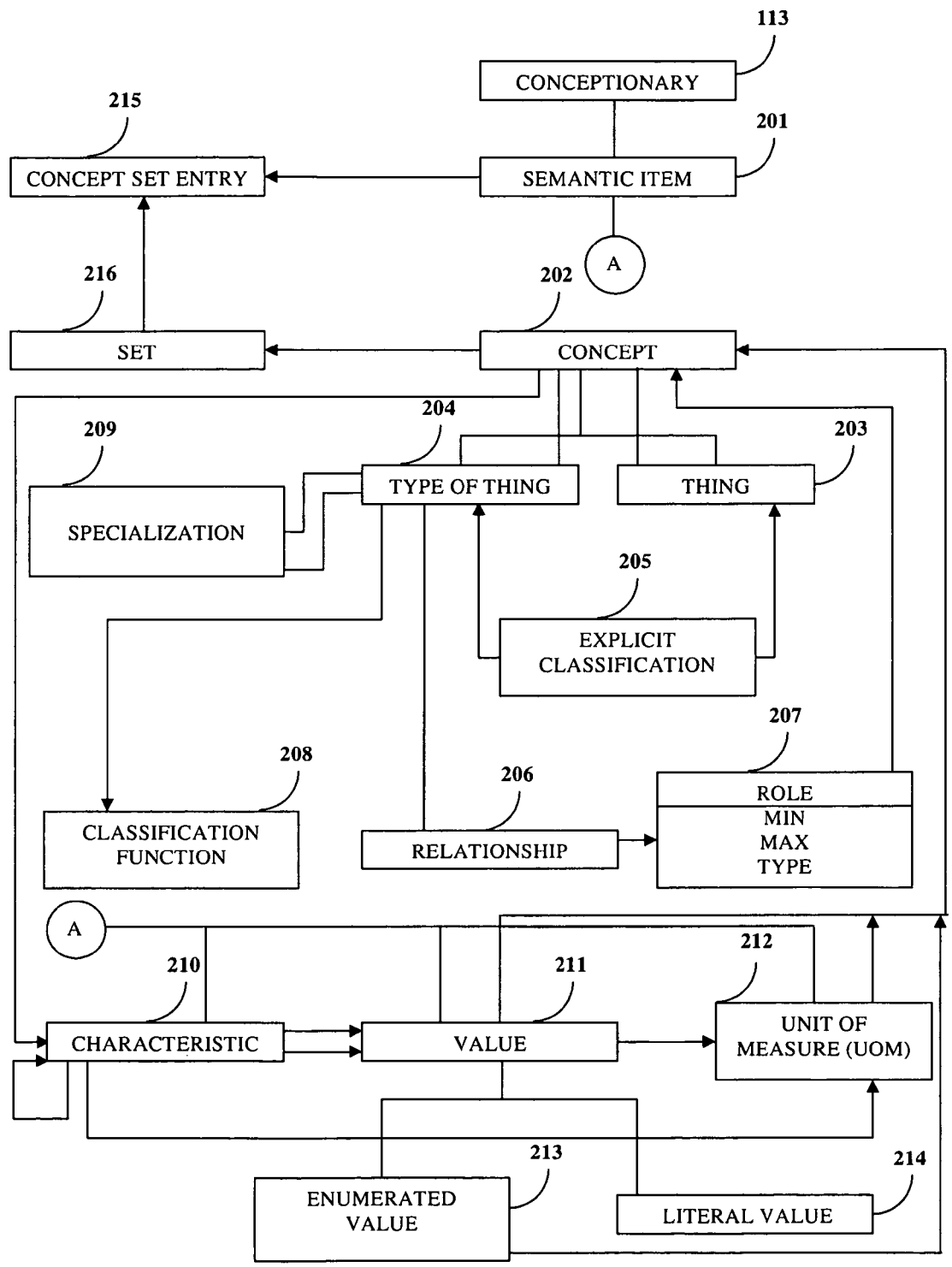
FIG. 2A exemplarily illustrates the architecture of a conceptionary.

FIG. 2A exemplarily illustrates the architecture of the conceptionary 113. The conceptionary 113 is a language 618 independent representation of ontology. The conceptionary 113 is composed of semantic items. A semantic item 201 is one of the following: a thing 203, a type of thing 204, a characteristic 210, or a relationship 206 between things and types of things, and concepts 203. As used herein, the term "concept" means a general idea derived from specific instances. A concept 202 can be a thing 203, or a type of thing 204. A thing 203 or a type of thing 204 is an explicit classification 205 of concepts 203. Explicit classification 205 does not require a classification function 208 to be defined. E.g. "Antarctica is at the south pole" is considered as an explicit classification 205. Explicit classification 205 allows a thing 203 to be an instance of a type of thing 204. Instances of concepts have relationship 206 between them. The relationship 206 can have different types of roles 207. The role has a type and a minimum and maximum value. For example, consider the sentence 101: "Joe has a wife". The role 709 in this sentence 101 is "wife". The minimum and maximum values a role 709 can attain are zero and one respectively in a monogamous society. Type of thing 204 includes a computed classification providing the classification function 208. The classification function 208 may be computed on basis of the information that the sentence 101 provides about the type of thing 204. For example, if the sentence 101 states: "That insect is crawling on the wall and spinning a web and the insect has six legs". The classification function 208 classifies the type of thing 204 as a spider. The specialization 209 defines specialization 209 of a thing 203 with respect to its sense 621. For example, consider the word "you". "You" can have different senses; it can signify a male or a female, depending upon the sense 621 of its usage. Therefore, there is a need for specialization 209.

Each semantic item 201 in the conceptionary 113 may contain characteristic 210, values 211 and units of measure 213. For example, consider the sentence 101: "He is six feet tall". In this example, six is the value 211, feet is the unit of measure 212 and tall is an indicator of height; therefore height is a characteristic 210. Values are further classified as enumerated value 213 and literal value 214. The literal value 214 is an absolute value, like the number six in the above example while an enumerated value 213 is again the concept 202. Semantic items are members of concept set entry 215. Occasionally the concept 202 may represent a set of other concepts or set of other semantic items. For example, for the concept 202 of a "family", the concept 202 can represent a set of members of a family which could include parents and children and grandparents and so forth, the concept 202 of two or three of the members of the family may represent a set 216 with entries in the concept set entry 215.

Figure 2B:
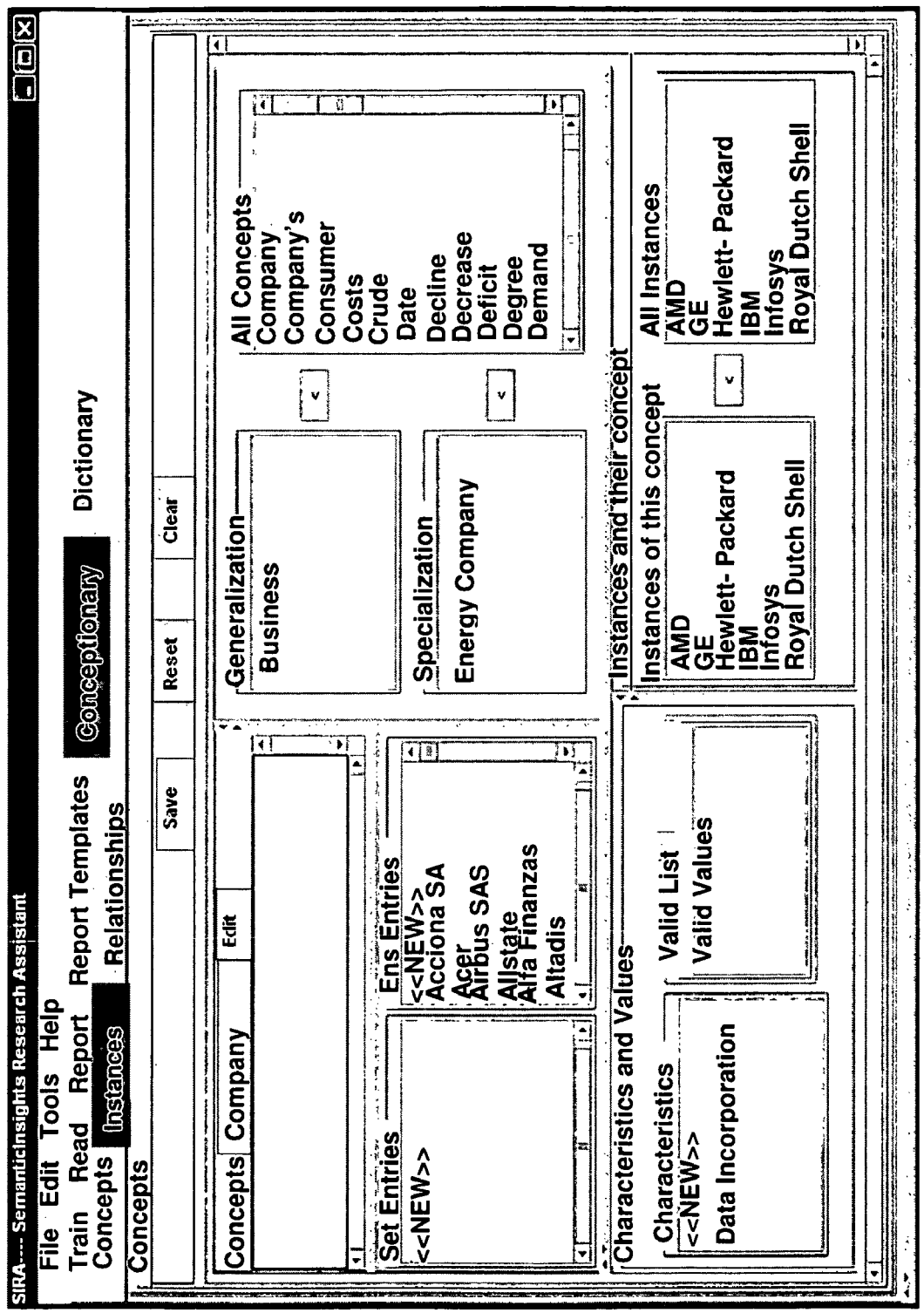
FIG. 2B exemplarily illustrates a conceptionary editor.

FIG. 2B exemplarily illustrates a conceptionary editor. The conceptionary editor allows a user to make and save changes to the conceptionary 113. The concept 202 is first selected in the concept panel. Click on "New", a prompt will appear to input a name of the concept, i.e. for a label for the concept. In FIG. 2B, the concept 202 is labeled as a company. The generalization box provides a super class of the concept. The current concept 202 is listed under the generalization "business". The specialization 209 is a further refinement of the generalization. The concepts selected from the box "All concepts" can be moved to the generalization or specialization box. FIG. 2B illustrates how instances of the concepts are captured.

The ENS 112*a* entries are other name for 'company', such as enterprise, concern etc. The ENS 112*a* entries can be created by double clicking on "New entries" and further entering a term or searching an entry for a new term. The ENS 112*a* identifies the equivalent name for the particular sense 621 of the word 607. The concept 202 represents a set of other concepts or relationships that it stands for. For example the concept 202 could be United Nations (UN), and the set entries would include the countries who are members of the UN. A characteristic 210 is a property of a concept 202. In FIG. 2B, property comprises a label called "date of incorporation". The interface shown in FIG. 2B allows a user to relate the characteristic 210 to the concept 202 in the conceptionary 113. The valid values list provides the value 211. In FIG. 2D, the valid value 211 is a numerical representation of the date of incorporation.

Figure 2C:
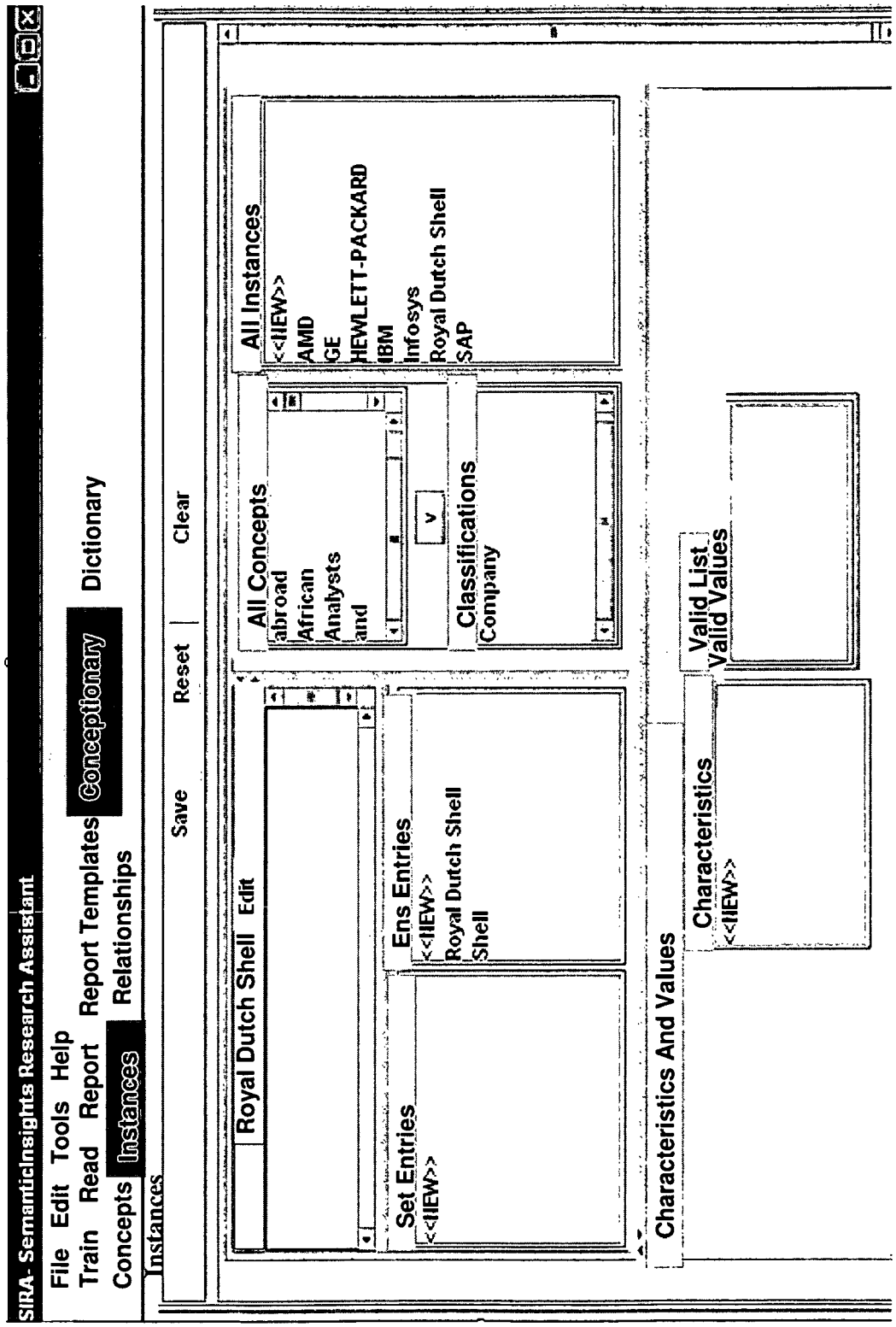
FIG. 2C exemplarily illustrates a screen shot of instances in the conceptionary.
Figure 2D:
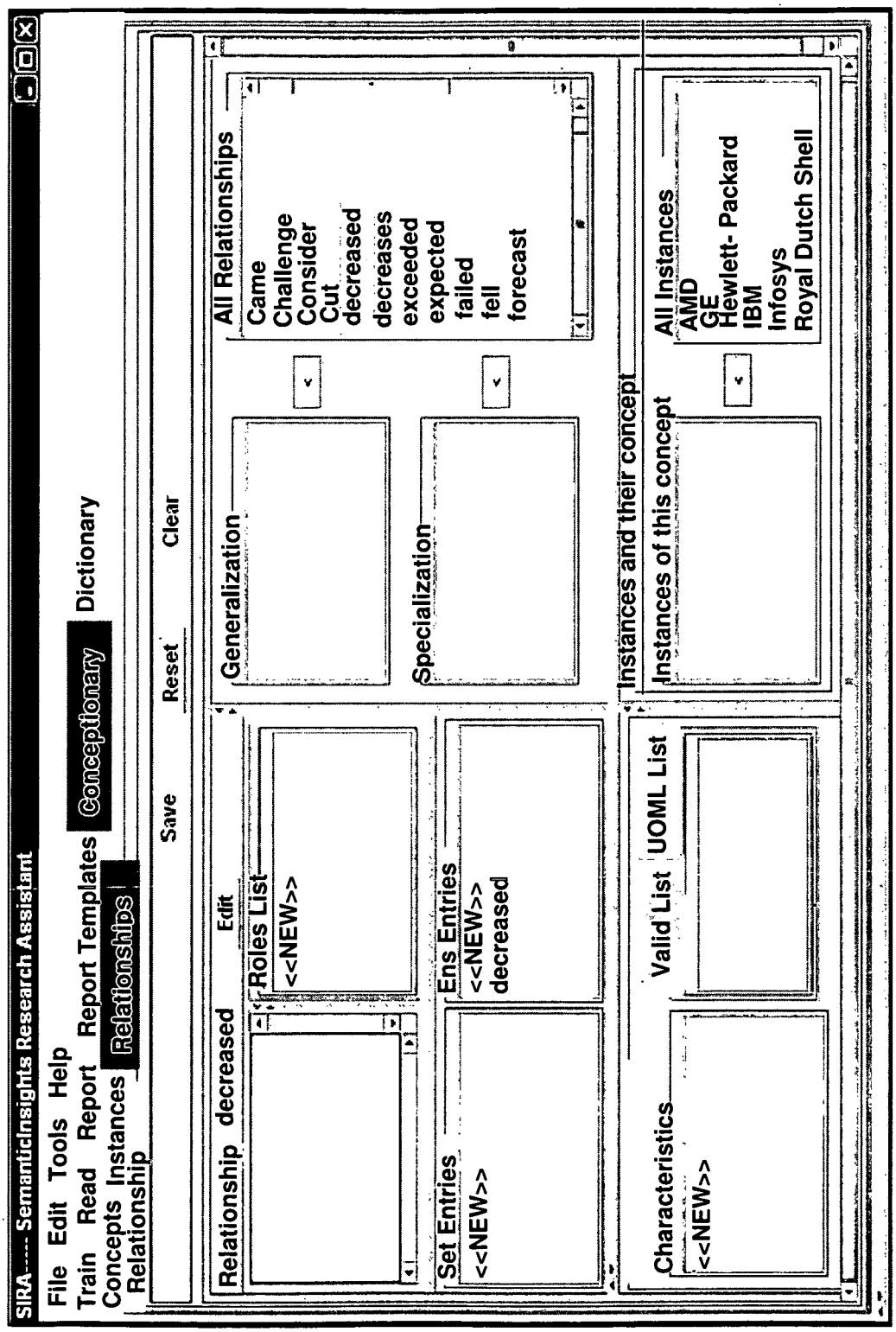
FIG. 2D illustrates a screen shot of relationships in the conceptionary.

FIG. 2C exemplarily illustrates a screen shot of instances in the conceptionary 113. The "V" button allows a user to select concepts in the all concepts window and send the selected concept 202 to the classification window. For each of the classifications, their characteristics also get placed in the characteristics box.

FIG. 2D illustrates a screen shot of relationships in the conceptionary 113. The user interface in FIG. 2D allows a user to describe a relationship 206 between concepts and concepts, between concepts and instances, and between instances and instances.

If the relationship 206 represents a term, for example 'given' or 'to give', then, role 1 may indicate a participant in the relationship 206 as the giver, role 2 may indicate what was given and role 3 may indicate the person who received. When a role 709 is created, the following relationships are derived: relationship 206 between concepts and concepts, between concepts and instances, and between instances and instances. The relationships can have characteristics and valid values. For example, for a relationship 206 called "decrease", an instance of when the decrease happened can be captured.

Figure 4:
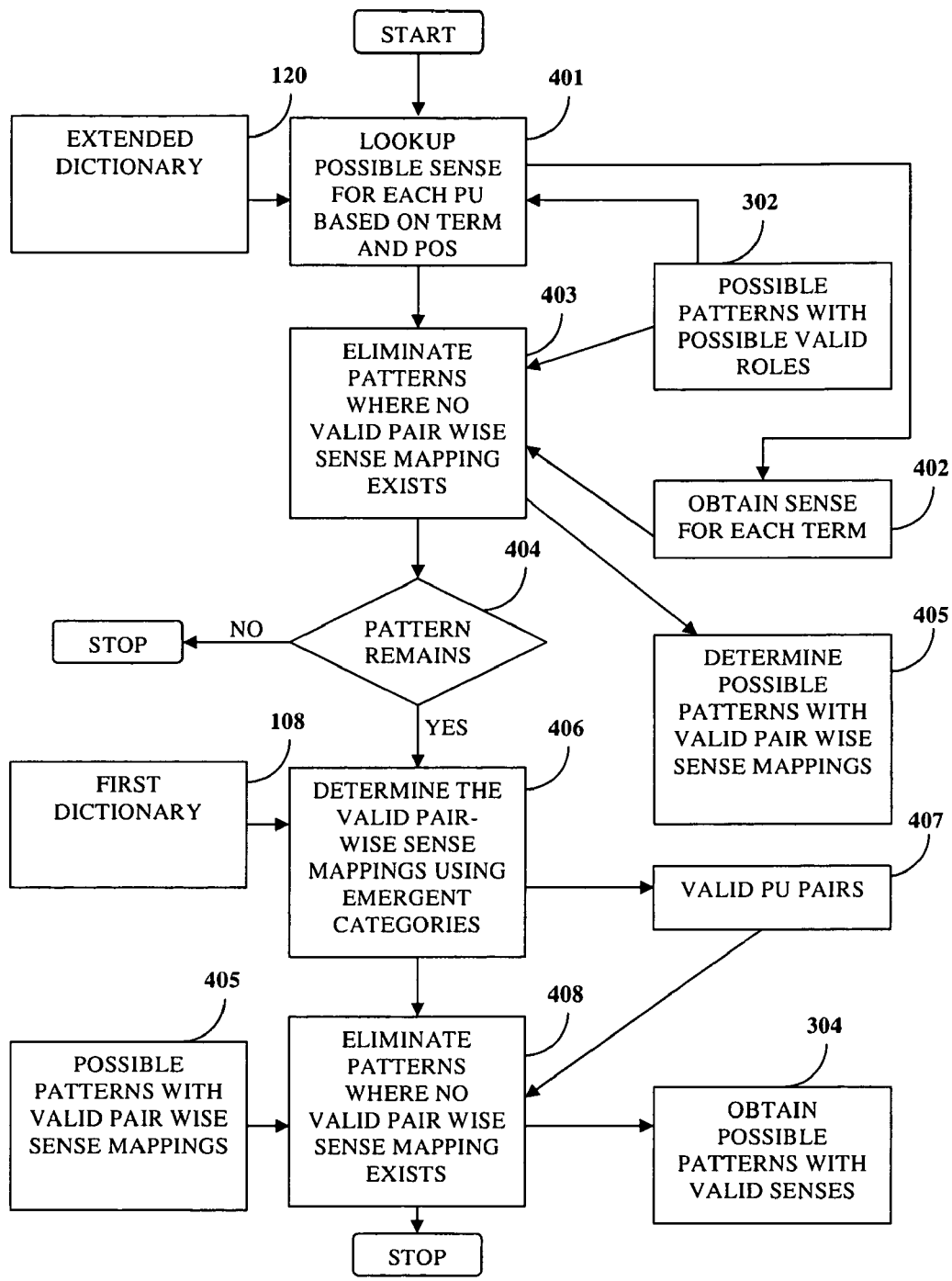
FIG. 4 exemplarily illustrates a method of determining valid senses for generated pattern units.

FIG. 3 exemplarily illustrates a method of identifying grammatical roles and senses of pattern units. Simple chunked sentences 106 are provided to generate DP 710 with PU 804 comprising grammatical roles and senses 110. The EPS 702 that could possibly map to the simple chunked sentences 106 is then found 301. The database 109 of EPS sets are then looked up to identify the EPS 702 that could possibly map to the simple chunked sentences 106. The possible pattern units with possible valid grammatical roles are then generated 302. Consider the patterns with possible valid roles in conjunction with the inputs from the first dictionary 108. For each possible pattern, the valid senses for each PU 804 are determined 303. A method of determining valid senses for each of the generated pattern units is illustrated in FIG. 4. Further the pattern units with valid senses are obtained 304. The possible patterns with valid senses are converted 305 to declared patterns with grammatical roles and senses. Thus, the DP 710 with the PU 804 with identified grammatical roles and senses is obtained 110.

A. The steps below provide a method of generating CF 112*b* from the DP 710:

1. A DP 710 identifies linguistic roles for each PU 804.

2. The PU 804 for specific corresponding pairs of linguistic roles can be identified. For example, if present, the respective PU 804 for the subject-transitive verb pair can be identified.
3. In addition, each PU 804 identifies either a specific ENS 112*a* or literal 614.
4. When two PU 804, each identifying an ENS 112*a*, also have linguistic roles for a valid CF 112*b* Type, a new CF 112*b* can be generated.
5. The ENS Category 616 containing each identified ENS 112*a* can be determined by:
   a) For each of the two ENS 112*a*
      (1) For each ENS Category 616 for this ENS 112*a*
         (a) If the CF 112*b* for this ENS Category 616 has the correct roles and the other ENS 112*a* is in the other ENS Category 616 then
            (i) CF 112*b* was found
            (ii) Done
      (2) If no appropriate CF 112*b* was found, then
         (a) Create a new CF 112*b* with the corresponding linguistic roles.
         (b) Create a new ENS Category 616 for each ENS 112*a*.
         (c) Associate the ENS Category 616 with the new CF 112*b* in their respective linguistic roles.
         (d) Done.

B. Generation of New CF 112*b* and ENS Categories through reasoning by analogy:
1. ENS category aggregation with CF 112*b* Generation
   a. If A←X→B and C←X→B then
      (1) Let D={A, C}
      (2) Create D←X→B
   b. If A←X→E and C←X→E then
      (3) Since D={A, C}
      (4) Create D←X→E
   c. If D←X→B and D←X→E then
      (5) Let F={B, E}
      (6) Create D←X→F
2. Evident ENS category aggregation
   a. Q={A, C, G, H}
   b. R={B, E, I, J}
   c. If Q←X→R and S←X→E and S←X→B and S←X→I and S←X→J then
      (1) Q={A, C, G, H, S}
3. Imputed ENS category aggregation
   a. Note: With analogy match function threshold>=75%
   b. Q={A, C, G, H}
   c. R={B, E, I, J}
   d. If Q←X→R and S←X→E and S←X→B and S←X→I then
      (1) Assert: S←X→J
      (2) Therefore: Q={A, C, G, H, S}

C. Generating DP 710 using CF 112*b*:
1. During training:
   a. Use POS Tagger 1001 to identify linguistic metadata 617
   b. Use sentence chunker 1002 to enable identification of EPS 702
   c. For each EPS 702 match for each PU 804
      (1) Find or create ENS 112*a*
      (2) Identify corresponding Role 709
2. During reading:
   a. Use second dictionary 112 to identify sets of possible linguistic metadata 617 and ENS 112*a* for each term
   b. Use database 109 of EPS to identify possible EPS 702 matches
   c. Use linguistic metadata 617 and EPS 702 matches to identify possible roles
3. Both:
   a. Use second dictionary 112 to find ENS Categories for each ENS 112*a*
   b. Use CF 112*b* DB to find or create CF 112*b* for each ENS category pair
   c. Use CF 112*b* to identify valid ENS 112*a* combinations
   d. Select the valid EPS 702 matches from previous EPS 702 matches with valid ENS 112*a* combinations
   e. Generate a DP 710 for each set of valid ENS 112*a* mappings for each valid EPS 702 match.

FIG. 4 exemplarily illustrates a method of determining valid senses for each of the generated pattern units. The computer implemented method disclosed herein elaborates the step of determining the valid senses for each PU 804 for each possible pattern pair occurring in the process of identifying grammatical roles of pattern units.

An extended dictionary 120 is provided with part of speech for each sense 621. The possible senses for each PU 804 are looked for 401 based on term and POS 613 for patterns with possible valid roles 302. Herein, the terms "term" and "word" are used interchangeably. The possible senses for PU 804 are looked for based on terms and POS 613 to obtain 402 senses for each term. The patterns where no valid POS 613 based sense mapping exists are then eliminated 403. The possible patterns which have valid POS 613 based sense mapping are then determined 405. The elimination process is repeated 404 as long as a pattern remains. The valid pair-wise sense mapping of the PU 804 is then determined 406 using the first dictionary 108 with emergent categories. A method of using emergent categories to determine the valid pair wise senses is exemplarily illustrated in FIG. 5A.

The valid pattern unit pairs are then obtained 407 and further used to eliminate 408 patterns where no valid sense based mapping exists. The possible patterns with valid senses are then obtained 304. For example, in the sentence 101 "run to the store," 'run' is a verb; whereas 'run' is a noun in the sentence 101 "please bring me that run", where 'run' could be a run of paperwork. The former sentence 101 will have a possible sense 621 based on POS 613 in a dictionary. The latter sentence 101 may or may not have a possible sense 621 based on POS 613 in the dictionary. Patterns are not eliminated just because a possible sense 621 is not identified in the dictionary. In these cases, emergent categories are used to determine whether a pattern is valid or not.

Figure 5A:
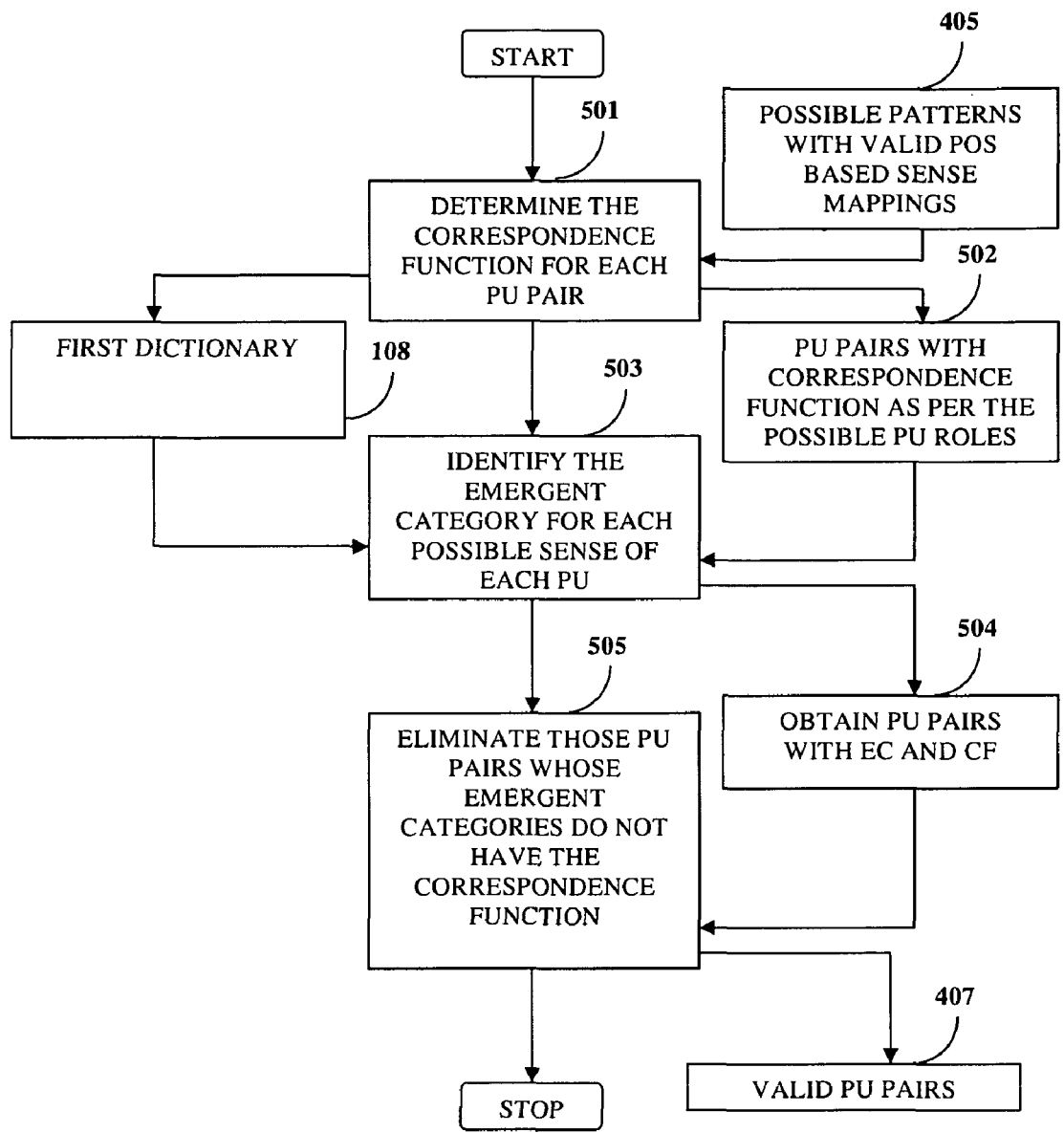
FIG. 5A exemplarily illustrates a method of using emergent categories to determine the valid pair wise senses.

FIG. 5A exemplarily illustrates a method of using emergent categories to determine the valid pair wise senses. The possible patterns with valid POS 613 based sense mapping are provided and the correspondence function (CF) 112*b* is determined 501 for each pattern unit pair. Apply a dictionary with declared emergent categories based on the CF 112*b*. The CF 112*b* is defined as relationship 206 between two sets of senses. For example, the CF 112*b* may relate a subject 907 and a verb 905, a subject 907 and a direct object 908, or a subject 907 and an indirect object 909, etc. The pattern unit pairs with the CF 112*b* are obtained which are pairings for a possible valid sense 621.

The emergent category for each possible sense 621 of each PU 804 in the pair is identified 503 for pattern unit pairs with correspondence functions per the possible pattern unit roles 502. The pattern unit pairs with emergent categories and correspondence functions are then obtained 504. The pattern unit pairs whose emergent categories do not have a correspondence function 112*b* are then eliminated 505. Then the valid pattern unit pairs are obtained 407. For example, "my dog ate my homework" is a valid pair wise sense, but "the table ate my homework" is not a valid pair wise sense.

Figure 5B:
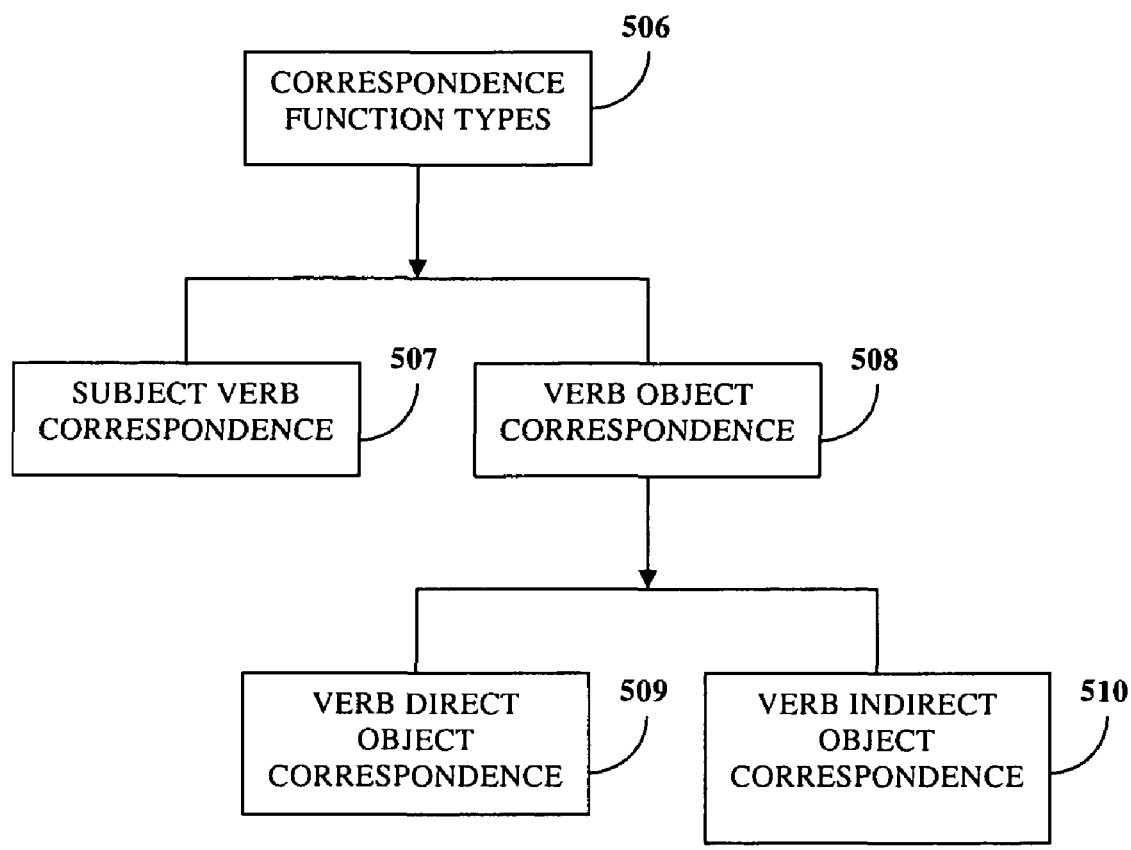
FIG. 5B illustrates the correspondence function types.

FIG. 5B illustrates the correspondence function types 506. Correspondence functions fall into two types: Subject verb correspondence 507, e.g. the correspondence in "Dog ate my homework," and verb object correspondence 508. Verb object correspondence 508 can be a verb direct object correspondence 509, for e.g. "Joe gave Bob the ball" and a verb indirect object correspondence 510, for e.g. "Joe took a beating". Correspondence functions are not specific to a kind of thing 203; however, correspondence functions are specific to emergent categories.

FIG. 6A illustrates a method of identifying ENS 112a for senses. The FIG. 6A elaborates the step of identifying ENS 112a for each PU 804 when the ENS 112a for a sense 621 does not exist in the second dictionary 112 with ENS 112a for each sense 621. A dictionary with senses 120 along with synonyms for each sense 621 is provided. Each sense 621 of a word 607 includes a corresponding ENS 112a. For example, consider the word 607 "run". The word 607 "run" has different senses in different sentences. The word 607 "run" means "manage" when it occurs in the sentence 101: "Joe runs a company.", whereas the same word 607 means "to hurry" when it occurs in the sentence 101 "Joe ran for office". Thus, "hurry" and "manage" are synonyms for run but they have different senses and for each sense 621 of the word 607 "run", i.e., "hurry" and "manage" there exists an ENS 112a.

The method of determining ENS 112a for senses comprises the following steps. For each sense 621 of the term whose ENS 112a is being constructed 602, the dictionary entry (DE) 619 for the term is looked for 601. The dictionary entries corresponding to synonyms of the sense 621 of the term whose ENS 112a are being constructed is determined 603. The senses of the synonyms are identified 604. The identified sense 621 of the synonym 620 to the ENS 112a being constructed is added 605 to the ENS 112a if the identified sense 621 of the synonym 620 is equal to the term. The process is repeated till the senses of the synonym 620 of the term are processed 606.

Figure 6B:
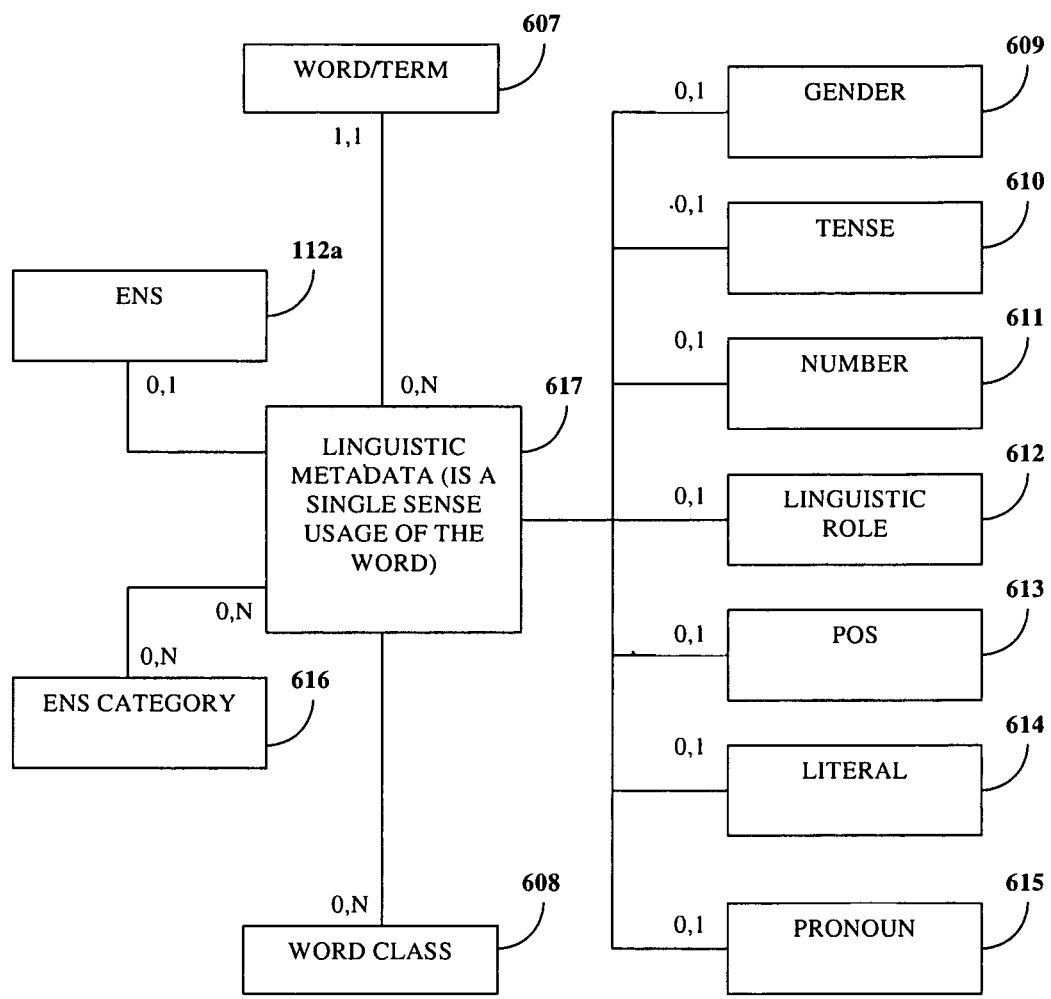
FIG. 6B illustrates linguistic metadata.

FIG. 6B illustrates linguistic metadata 617. A word or term 607 can comprise any number of linguistic metadata 617 associated with it. A word or term 607 is or is associated with a gender 609, a tense 610, a number 611, a linguistic role 612, parts of speech (POS) 613, literal 614, and a pronoun 615. Linguistic metadata 617 includes a word class 608 associated with it. Linguistic metadata 617 also comprises zero or many ENS category 616 to determine which sense 621 of the word 607 to be used. Linguistic metadata 617 further comprises an ENS 112a that provides a set of words or terms, which among themselves have close enough meaning to be considered equivalent in a given language 618 and context.

Figure 6C:
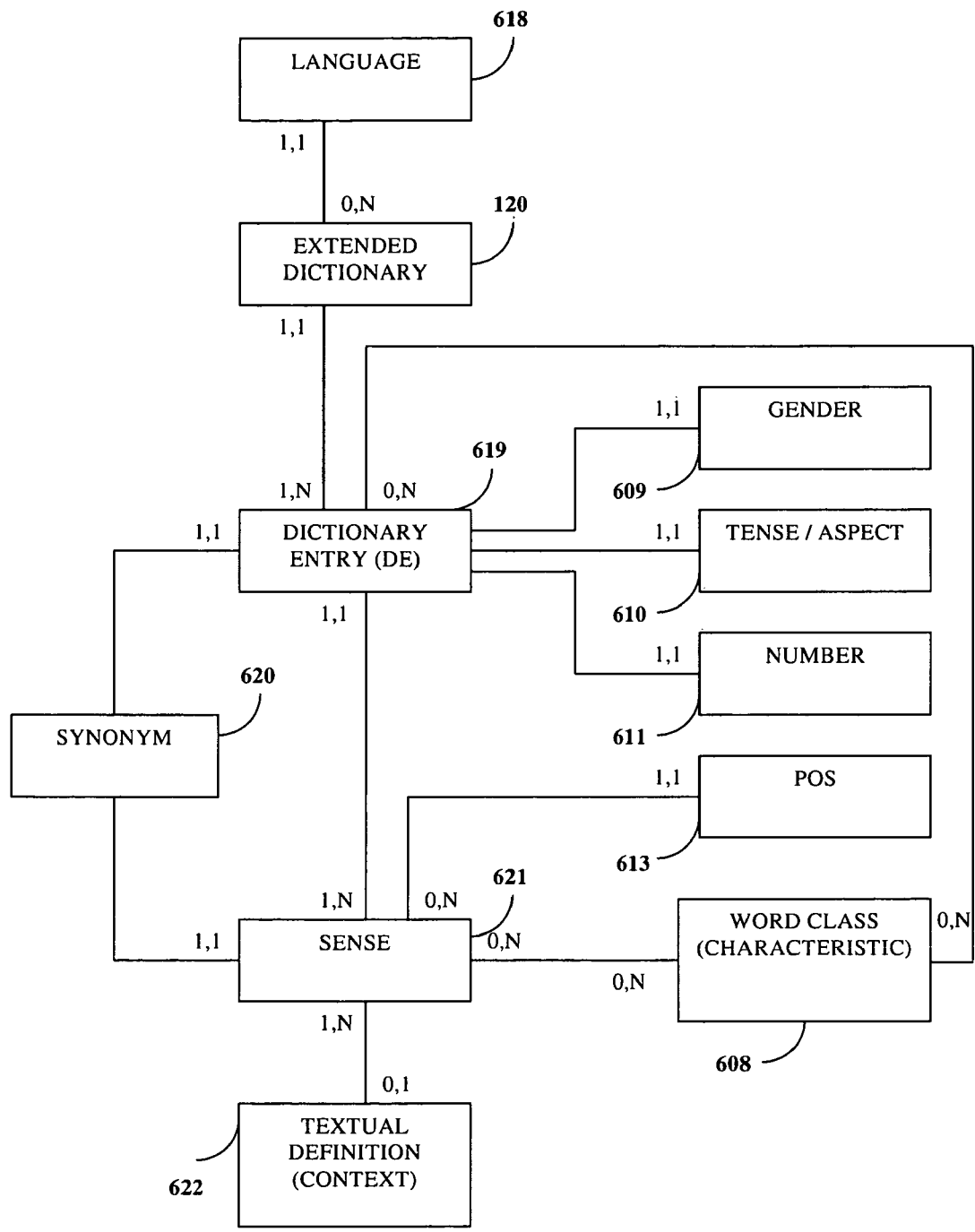
FIG. 6C is an exemplary illustration of one embodiment of an extended dictionary.

FIG. 6C is an exemplary illustration of one embodiment of an extended dictionary 120 with senses. Each language 618 comprises multiple extended dictionaries 120 with senses. Each of the extended dictionaries 120 with senses comprises many dictionary entries 619. Each of these dictionary entries 619 refers to a gender 609, a tense or aspect 610, and a number 611. Each dictionary entry 619 comprises one or many senses 621. The sense 621 identifies the POS 613. The sense 621 also identifies word classes (characteristic), where a word class 608 is a way of identifying the sense 621 of a dictionary entry 619 as belonging to other dictionary entry senses. A word class 608 can identify many senses. A sense 621 of a dictionary entry 619 can comprise a synonym 620. Each sense 621 may comprise a textual definition 622.

Figure 7:
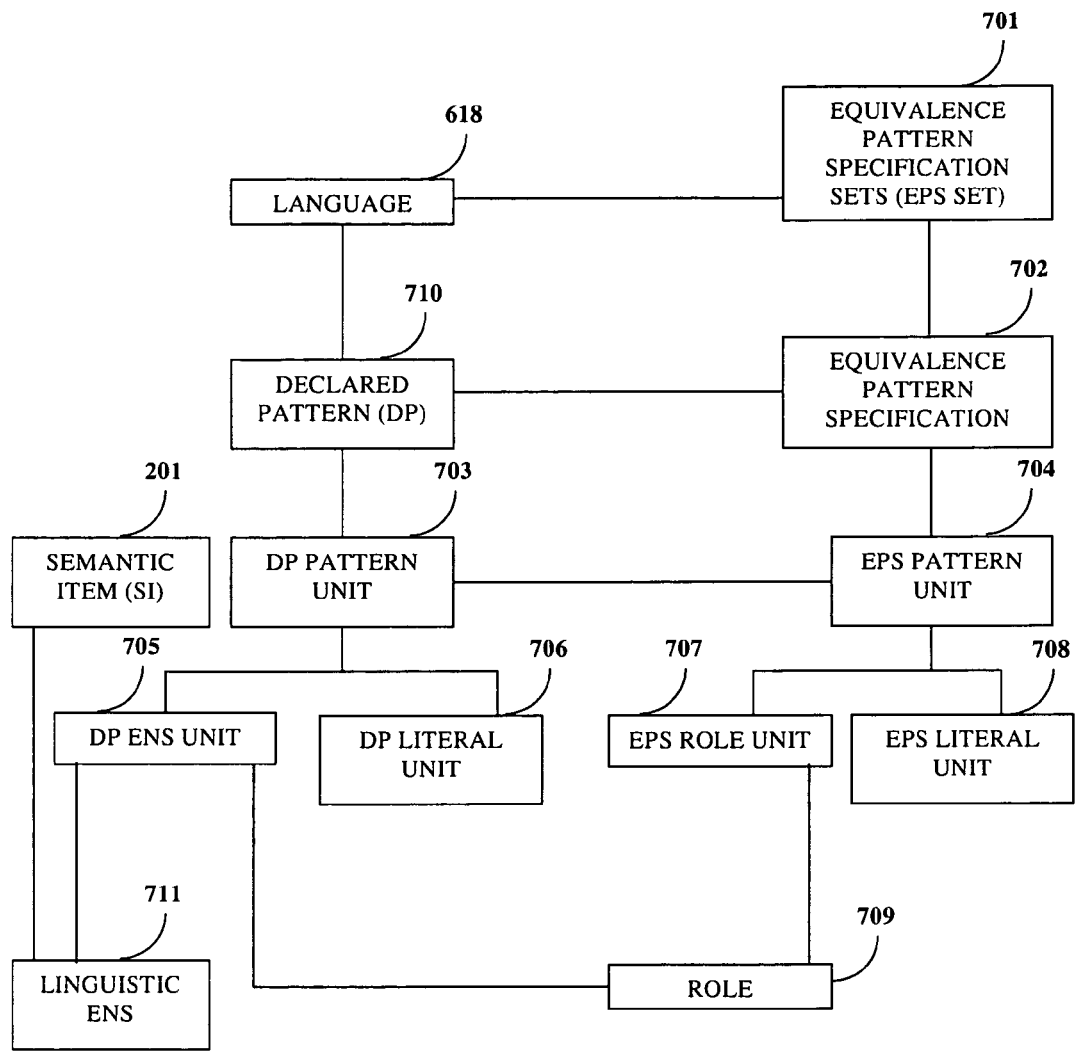
FIG. 7 exemplarily illustrates a block diagram of equivalent pattern sets.

FIG. 7 illustrates the block diagram of EPS sets 701. Each of the EPS sets 701 corresponds to a specific language 618. Each language 618 has potentially zero or many declared patterns 710. Each of the EPS sets 701 comprises a multiplicity of equivalent pattern specifications 702. Each of the equivalent pattern specifications 702 comprises zero or many EPS pattern unit 704. Each DP 710 comprises zero or many declared pattern units. Each declared pattern unit 703 may comprise one or more matching pattern units, i.e. EPS pattern unit 704. Each EPS pattern unit 704 may comprise zero or many declared pattern unit 703. Each declared pattern unit 703 may be one of two continents, i.e. either a DP ENS unit 705 or a DP literal unit 706. If the declared pattern unit 703 is of kind DP ENS unit 705, then the declared pattern unit 703 must contain a linguistic ENS 711. Each linguistic ENS 711 corresponds to zero or one semantic item 201. Further, each DP ENS unit 705 must have a role 709 that connects the DP ENS unit 705 to the EPS role unit 707. Each EPS pattern unit 704 may be either one or one of two components: EPS role unit 707 or EPS literal unit 708.

Figure 8A:
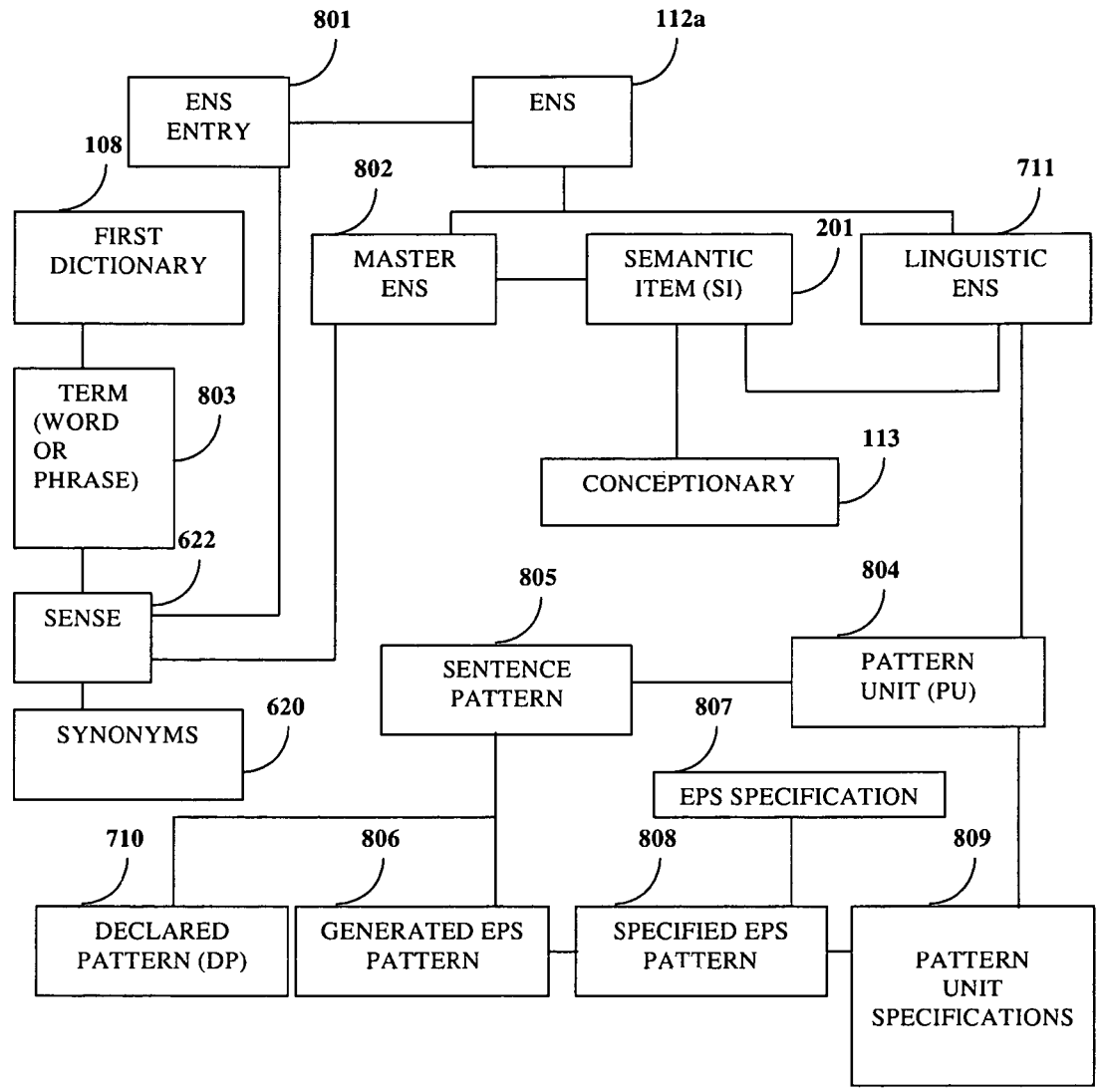
FIG. 8A exemplarily illustrates a block diagram of equivalent name sets.

FIG. 8A illustrates the block diagram of an ENS 112a. An ENS 112a comprises one of two kinds; master ENS 802 and linguistic ENS 711. Each ENS 112a comprises zero or many ENS entries 801. Each ENS entry 801 corresponds to zero or one senses. Each sense 621 is a sense 621 for any term. A term is a word 607 or a phrase 803. Each term 803 is listed in the first dictionary 108. Each sense 621 may have zero or many synonyms. Each semantic item 201 comprises one master ENS 802. Each semantic item 201 may have zero or many linguistic ENS 711. The conceptionary 113 comprises zero or many semantic items. A sentence pattern 805 comprises zero or many pattern units 804. Each PU 804 comprises one linguistic ENS 711. A sentence pattern 805 is one of the following two types: a DP 710 or a generated EPS pattern 806. A generated EPS pattern 806 arises from a specified EPS pattern 808. The specified EPS pattern 808 includes one pattern found in an EPS specification 807. The PU 804 comprises pattern unit specifications 809.

If the ENS 112a of a sense 621 is to be constructed, then the ENS entries 801, along with all the terms 803 referred to, have to be considered. The master ENS 802 which contains all the terms of the word 607 is created. A linguistic ENS 711, a subset of the master ENS 802 is provided to determine the appropriate linguistic sense 621 of a word 607. For example, in the German language, one can call "you" as "Sie" or "du". But "Sie" is used in a formal manner of addressing a person while "du" is used in an informal manner of addressing a person. Thus, even if the master ENS 802 allows both "Sie" and "du" as ENS for "you", the linguistic ENS 711 provides only the correct ENS for the given language 618 and culture. The linguistic ENS 711 further condenses the output of master ENS 802 to provide an appropriate usage of the word 607. For example, if a certain word 607 includes thirty senses, the word 607 has thirty master ENS 802, one for each sense 621. However, there may be much less than thirty linguistic ENS 711.

Figure 8B:
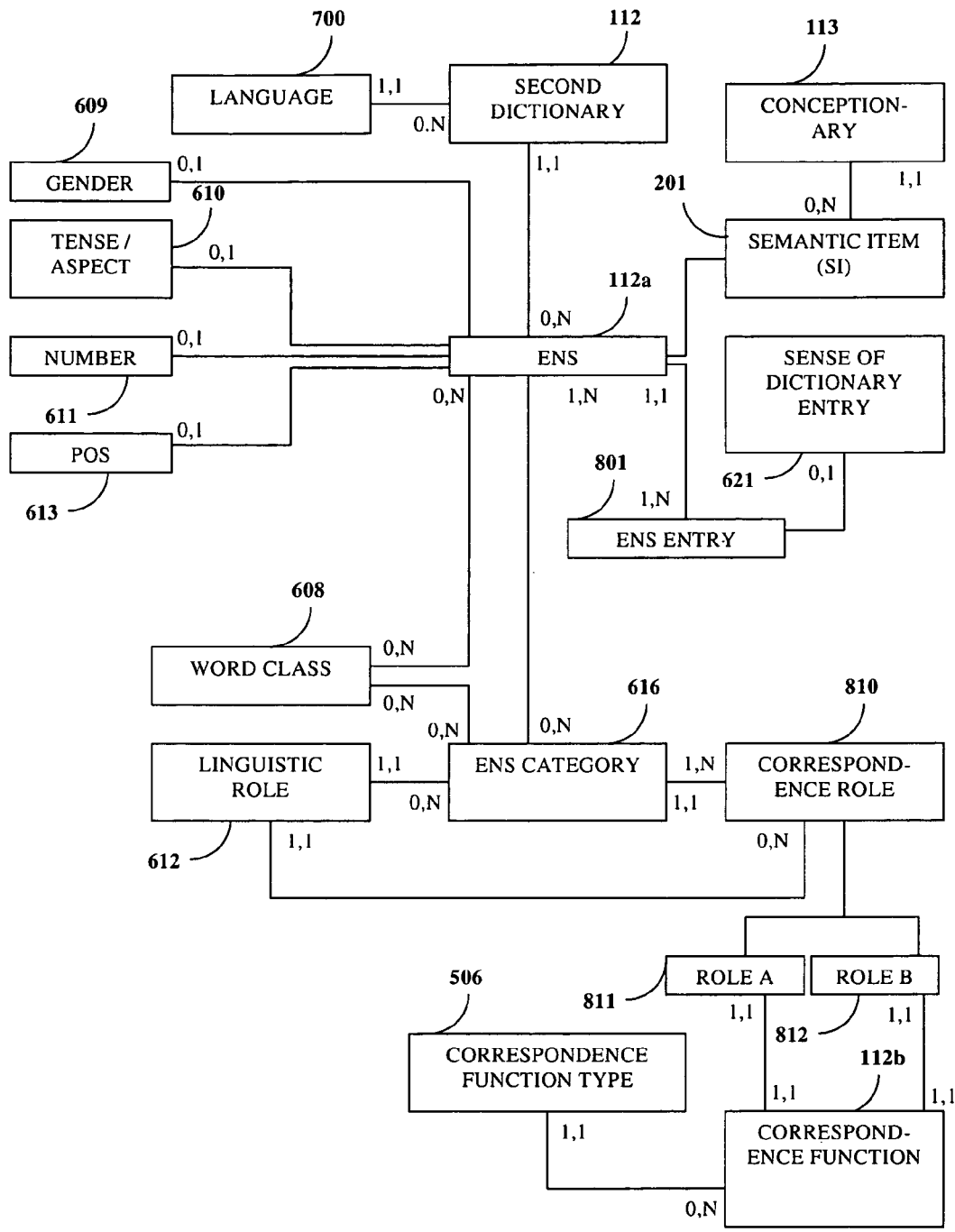
FIG. 8B exemplarily illustrates an equivalent name set (ENS) and an ENS category.

FIG. 8B exemplarily illustrates ENS 112a and ENS category 616. Each ENS corresponds to a language 618. Each ENS 112a consists of one or many ENS entries 801. Each ENS entry 801 corresponds to zero or one sense 621. Each semantic item 201 includes an ENS 112a. The conceptionary 113 comprises zero or many semantic items. An ENS 112a is further associated with a gender 609, a tense or aspect 610, a number 611 and POS 613.

ENS category 616 participates in a number of correspondence functions 112b. Correspondence roles participate in correspondence functions as either role A 811 or role B 812, i.e. role A argument or role B argument in the CF 112b. For example, role A 811 could be a subject role, or role B 812 could be the role played by the object. Each ENS category 616 plays one or the other of these roles within a given CF 112b. The CF 112b could be one of the correspondence function types 506 described in FIG. 5B. Each ENS category 616 can participate in a number of word classes, and word classes can have a number of ENS categories. An ENS category 616 fulfills one and only one linguistic role 612. Each correspondence role 810 also refers to the same linguistic role 612.

Figure 9:
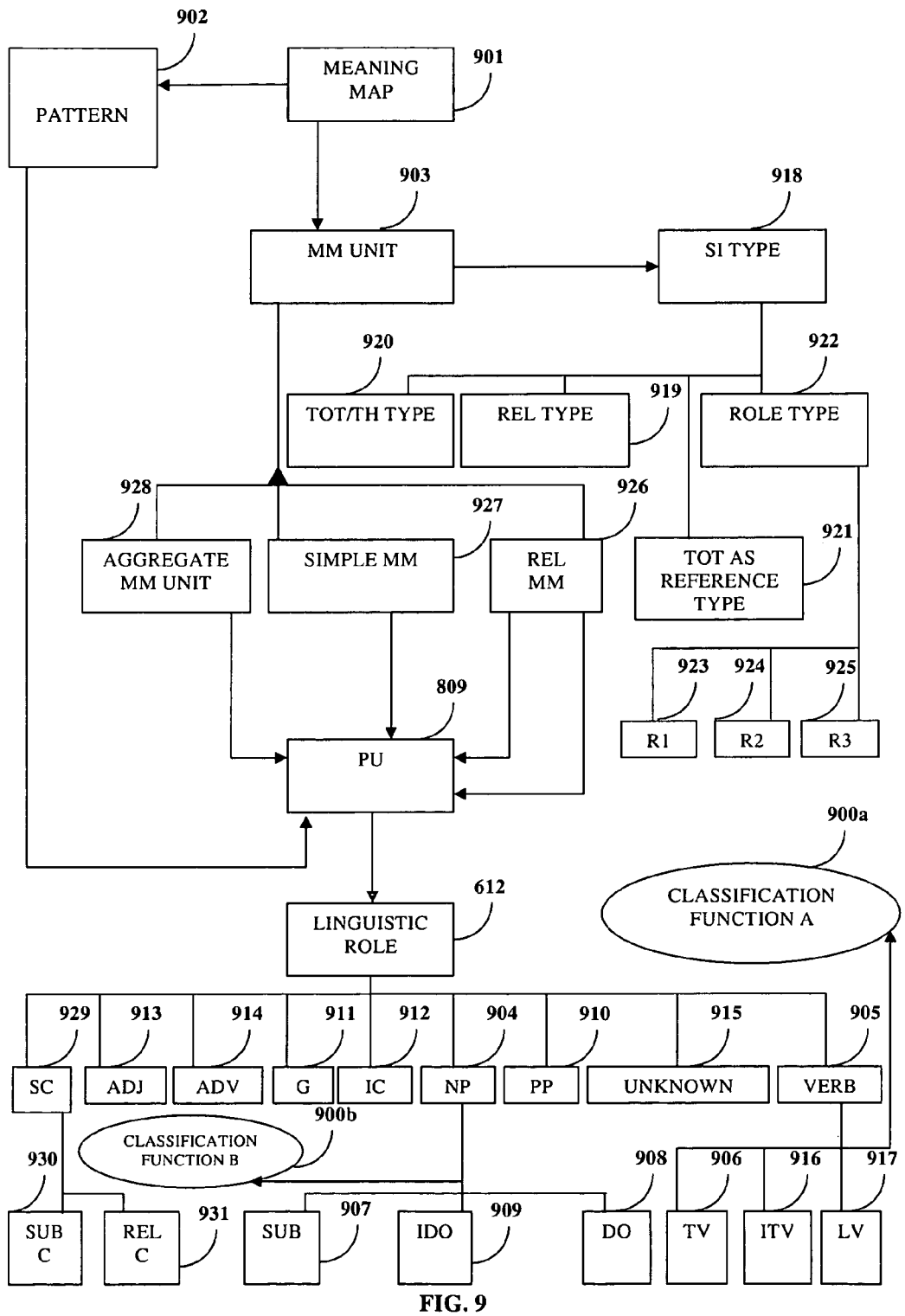
FIG. 9 exemplarily illustrates the block diagram of a meaning map.

FIG. 9 exemplarily illustrates the block diagram of a meaning map 901. The meaning map 901 is composed of zero or many meaning map unit 903. Each meaning map unit 903 refers to one semantic item (SI) type 918. Each meaning map (MM) unit 903 may be one of three kinds; aggregate MM 928, simple MM 927, and REL MM 926. Each pattern 902, for example an EPS specification 807, includes one or many pattern units 804. A simple MM 927 refers to one pattern unit. A PU 804 may reference zero or many simple MM 927. An aggregate MM 928 is composed of one or many pattern units 804. A REL MM 926 refers to one and only one PU 804 and refers from one PU 804. Each PU 804 includes a single linguistic role 612. Each linguistic role 612 is one of the following kinds; sentential complement 929, adjective 913, adverb 914, gerund clause 911, infinite clause 912, noun phrase 904, prepositional phrase 910, unknown 915, and verb phrase 905. Each sentential complement 929 is one of two kinds; subordinate clause 930 or relative clause 931. Each noun phrase 904 is one of three kinds: a subject 907, an indirect object 909, or a direct object 908. Each verb phrase 905 is one of three kinds: transitive verb 906, intransitive verb 916, or linking verb 917. Classification function A 900a is used to determine whether the verb 905 is one of transitive verb 906, intransitive verb 916, or linking verb 917. A different classification function B 900b is used to differentiate or distinguish the kinds of noun phrase 904. The SI type 918 is one of four different types: REL type 919, TOT/TH. type 920, role type 922, and TOT as reference type 921. Each role type 922 is either a R1 923, R2 924, or R3 925.

The meaning map 901 maps a PU 804 to an SI Type 918 in the conceptionary 113. Ontology as defined herein is a set of semantic items and their inter-relationships. If a semantic item 201 with an ENS 112a is not present in the conceptionary 113, the semantic item 201 is created in the conceptionary 113 using meaning maps.

There are different patterns in which PU 804 occur in a sentence 101. For example, a subject may occur with a verb, a subject may occur with a noun, etc. Accordingly there are different patterns 902 such as subject-verb, subject-noun, verb-object, etc. For example, the PU 804 can be a noun phrase 904 which may be a subject 907, a direct object 908, or an indirect object 909. The PU 804 can also be a preposition phrase 910, a gerund clause (GC) 911, an infinitive clause (IC) 912, an adjective 913, an adverb 914 or may be of an unknown 915 type. These are the various linguistic roles the PU 804 may have. The listing of linguistic roles in FIG. 9 is exemplary and not meant to be limiting.

To exemplarily illustrate the different constituents of the meaning map 901, consider the example: "Joe gave the ball." In this example, the PU 804 for "Joe" is a noun phrase which is also a subject. The word 607 "gave" is a verb 905 of a transitive verb 906 type and "ball" is another noun phrase 904. Similarly, the verb 905 may also be of intransitive verb 916 or linking verb (LV) 917 types. The meaning map unit 903 provides the SI type 918. SI type 918 can further be of the following types: relation (REL) type 919, type of thing or thing (TOT/TH) type 920, type of thing (TOT) as reference type 921 and role type 922. The different semantic item types may be explained using the example considered above. In this example, "Joe" and "ball" are a type of thing or thing type 920. "Gave" is the REL type 919 which maps directly to the things "Joe" and "ball" present in the sentence 101. There exists a role 709 between the type of thing or thing type 920 and REL type 919. The relationship 206 between "Joe" and "gave" is that of a giver. Therefore, the relationship 206 between the PU 804 "Joe" and the PU 804 "gave" is mapped in the relationship meaning map called the REL MM 926. The role type 922 connects the relationship 206 to the related concepts 203. The relationship 206 and role type 922 have been defined for connecting the concepts "Joe" and "ball". "Joe" is assigned the role 709 of a giver to express that the relationship 206 is not a reflexive relationship. Role types 922 are of the following three types: R1 923, R2 924 and R3 925. R1 923 may be the relation between subject 907 and verb 905. R2 924 may be the relation between verb 905 and direct object 908. R3 925 may be the relation between verb 905 and indirect object 909. The definition of role type, 922 R1 923, R2 924 and R3 925 provided above are exemplary, and not used herein in a limiting sense 621.

The classification function 208 may be computed on basis of the information that the sentence 101 provides about the type of thing 204.

The meaning map unit 903 map to one of the following types of meaning maps: aggregate meaning map 928, simple meaning map 927 and relationship meaning map (REL MM) 926. Simple meaning map 927 contains references of all pattern units 804 that have been decomposed into simple terms and comprise only singular terms. Aggregate meaning map 928 contains pattern units 804 that comprise a plurality of terms.

For example, consider the following two sentences:
Sentence 1. Wake up the person.
Sentence 2. Wake the person up.

In sentence 1, the terms "wake" and "up" occur as consecutive terms. While in sentence 2, the terms "wake" and "up" do not occur as consecutive terms. However the two sentences convey the same meaning. Thus, aggregate meaning map 928 comprises aggregate terms whose combined meaning has a meaning different from a simple combination of the meanings of the individual parts.

Sentential complement (SC) 929 is a type of linguistic role 612 comprising subordinate clause (SUB C) 930 and relative clause (REL C) 931. For example, consider the two sentences below:
Sentence 1. If Joe goes to California, he will return on Monday.
Sentence 2. Joe wished he went to California.

In sentence 1, "goes to California" and "return on Monday" are two concepts, related to each other forming a relative clause (REL C) 931. In sentence 2, "went to California" is subordinate to the related "wishing". Hence, "went to California" is of the subordinate clause (SUB C) 930 type.

Figure 10A:
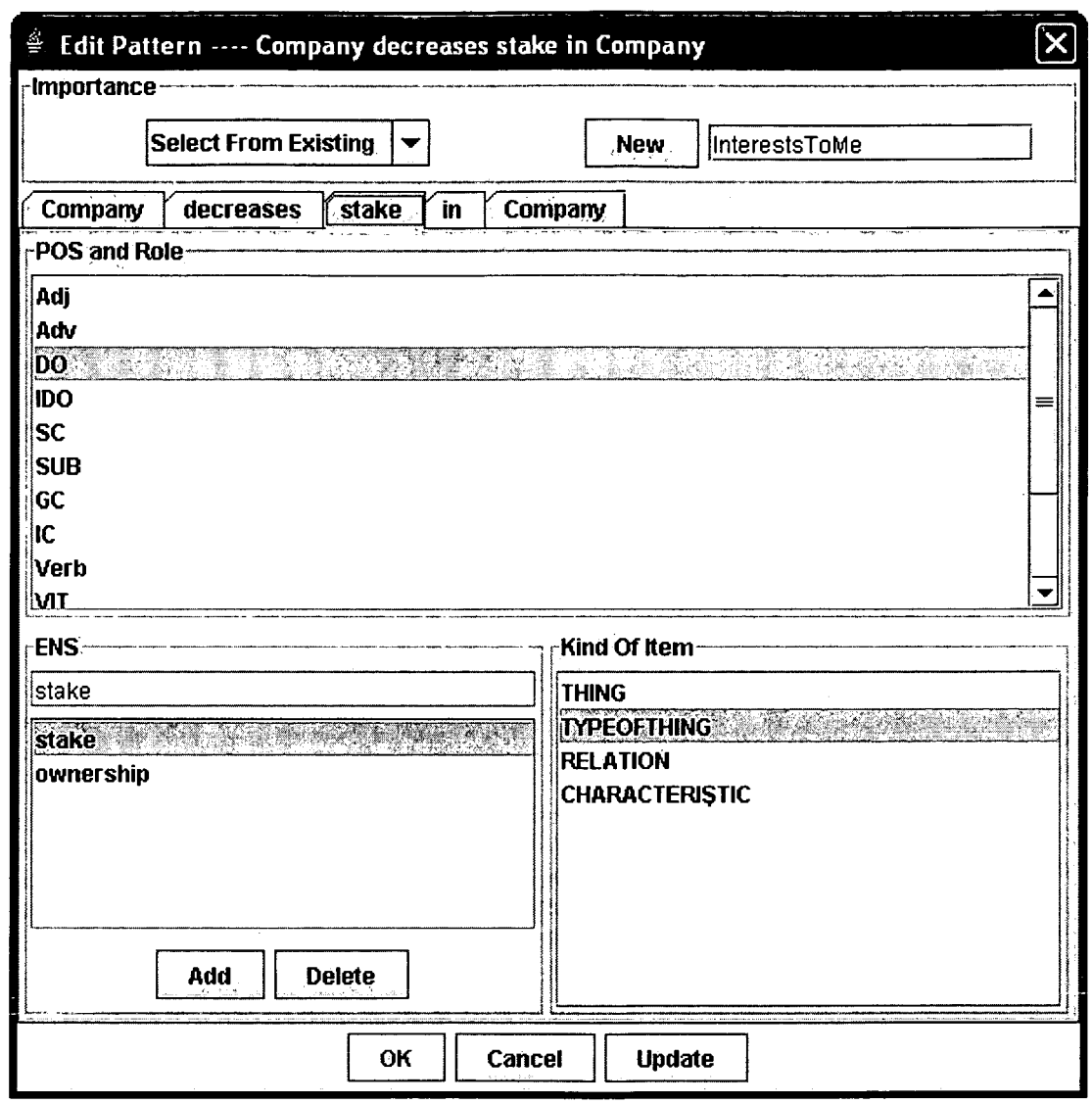
FIGS. 10A-10D exemplarily illustrate an example of generating declared pattern from a sentence.
Figure 10B:
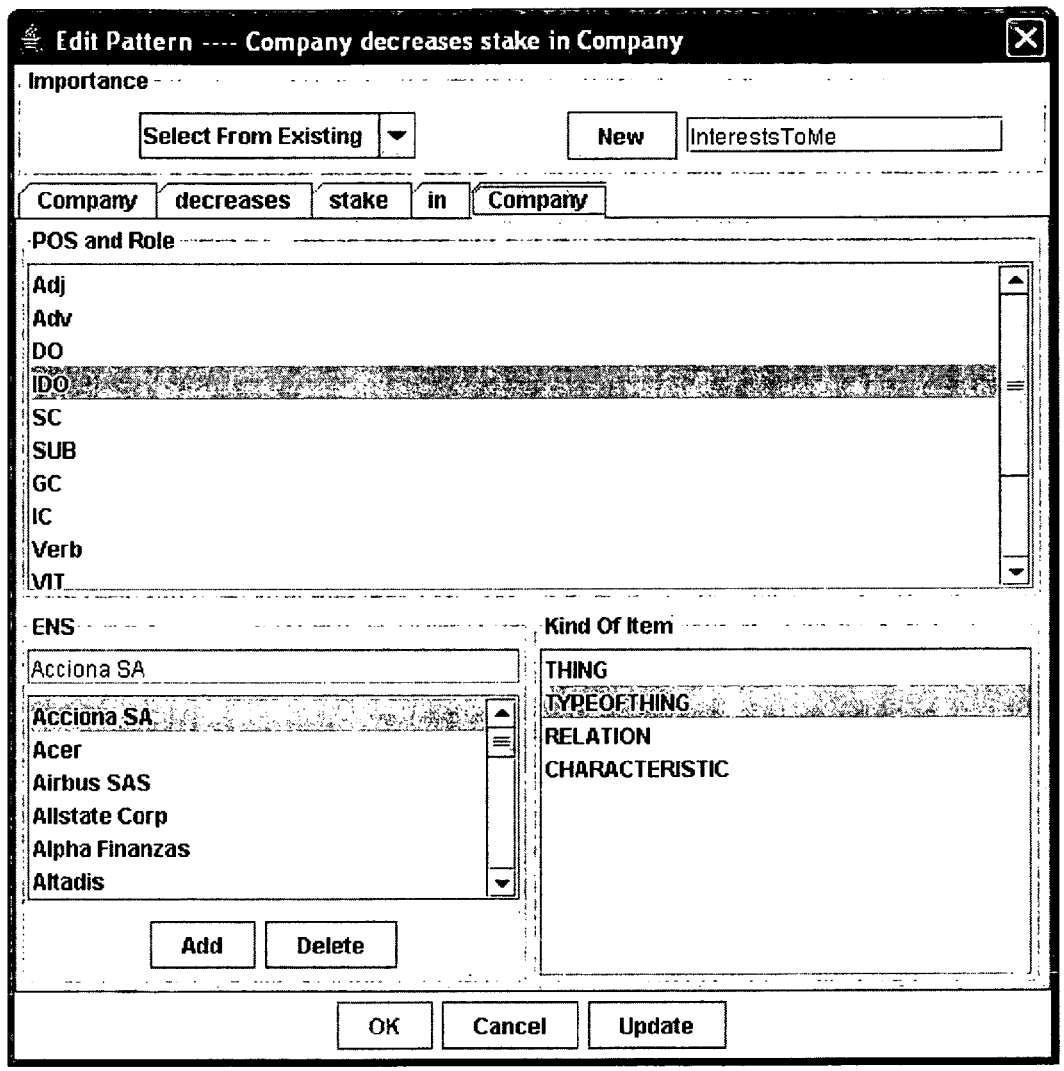
Figure 10C:
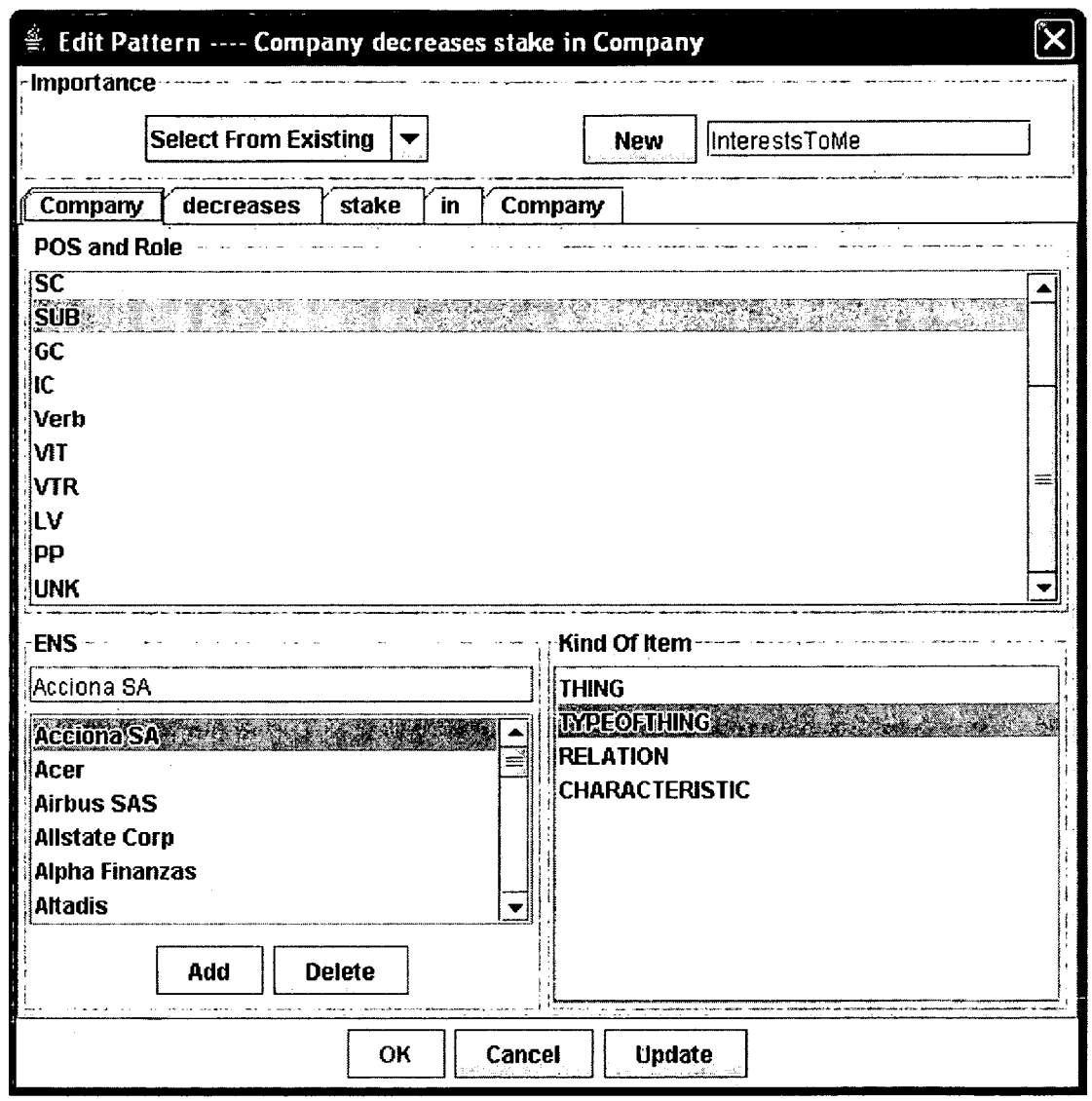
Figure 10D:
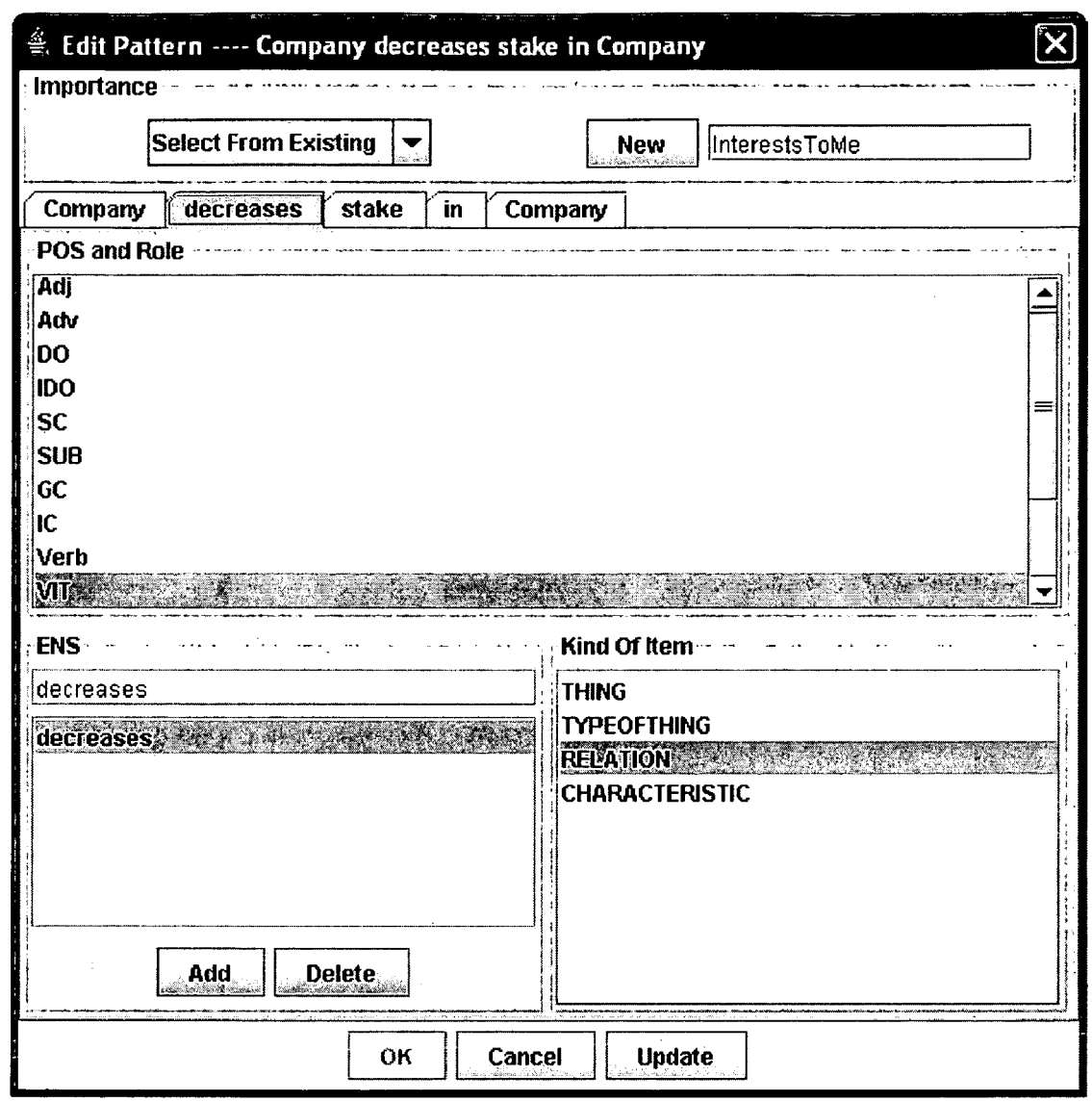

FIGS. 10A-10D exemplarily illustrate an example of generating a DP 710 from a sentence 101. The sentence 101 considered in the example is "Company decreases stake in Company." In FIG. 10A, "stake" is identified as a direct object in the sentence 101, which is the role 709 the word 607 is playing in the pattern. In FIG. 10B, "company" (second occurrence) is identified as an indirect object. In FIG. 10C, "company" is identified as the subject in the sentence 101. In FIG. 10D, "decreases" is identified as an intransitive verb (VIT). Thus, the input sentence "Company decreases stake in company" is processed to arrive at the DP 710 as exemplified in the FIGS. 10A-10D.

Figure 11:
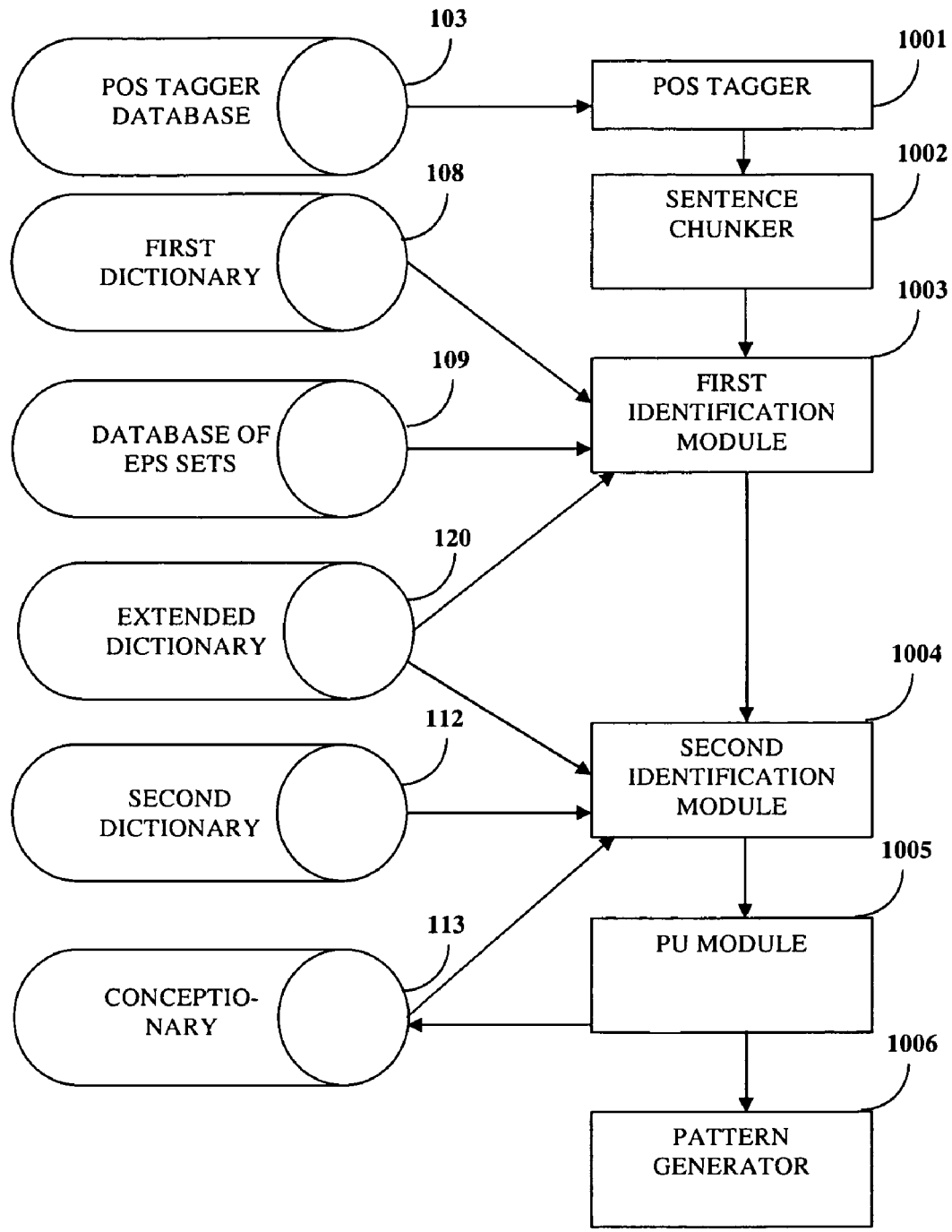
FIG. 11 exemplarily illustrates a computer implemented system for automatic declared pattern generation.

FIG. 11 illustrates a computer implemented system for automatic DP 710 generation. The parts of speech (POS)

Tagger 1001 accesses the POS tagger database 103 and then sends the POS tagged sentence 104 to the sentence chunker 1002. The sentence chunker 1002 sends the chunked sentence to a first identification module 1003 that identifies the grammatical roles and senses for each PU 804. The first identification module 1003 accesses the first dictionary 108, extended dictionary 120, and the database 109 of EPS sets to identify the grammatical roles and senses for each PU 804. The sentences with the rules and senses for each PU 804 identified are then sent to a second identification module 1004 that identifies the ENS 112a for each PU 804. The second identification module 1004 accesses the second dictionary 112, extended dictionary 120, and the conceptionary 113 to identify the ENS 112a for each PU 804. The pattern units with each ENS 112a identified are then sent to find or create the semantic items for PU module 1005. The PU Module 1005 then updates the conceptionary 113 with new semantic items. A pattern generator 1006 generates the declared patterns for the sentence using the identified ENS 112a.

Examples of industrial applications of the method and system disclosed herein are provided below.

Automatically generated declared patterns may be applied in keyword search engines. Automatic generation of declared patterns provide a method for analyzing the terms composing a sentence 101, and expressing the meaning of the terms in the context of that sentence 101 thereby enriching the reading experience of the user. Declared patterns have equivalent terms and have a meaning closely associated to the provided search string. Therefore, declared patterns help in providing effective search results while searching information of interest from a document corpus since the results are concentrated around the senses of the word 607 in which it occurs in the search pattern.

In another industrial application, automatically generated declared patterns may be used to enhance the reading style and reading experience of a user. As defined herein, a user's reading style is a formal manifestation of his/her worldview. The worldview of the user comprises the reading style and private ontology of the user. The worldview reflects the logic and structure with which a user comprehends a document. Patent application No. 1819/CHE/2005 filed in the Indian Patent Office on Dec. 13, 2005 illustrates a method of capturing the reading style of a user, wherein the reading style is a set of one or more declared patterns. The method disclosed herein provides a method of applying the reading style of a user for analyzing sentences.

The method and system disclosed herein, employing a reading style can be applied in determining the information of interest from a document corpus in a target language 618. The method and system of automatic generation of declared patterns and matching declared patterns to the document corpus to determine which document(s) contain sentences that match the original declared patterns helps in providing document(s) as the information of interest to the user.

The method and system disclosed herein hastens up the search results by filtering and concentrating the search results around only those declared patterns that match the sense 621 of the search word 607 in the context in which it occurs in the search pattern.

The method and system disclosed herein generates synonyms of a word 607 and provides the synonyms which are semantically closest and also match the environment in which the word 607 is being put into use.

It will be readily apparent to a person with skill in the art that the various methods and algorithms described herein may be implemented as computer readable medium, e.g., appropriately programmed general purpose computers and computing devices. Typically a processor, for example, one or more microprocessors will receive instructions from a memory or like device, and execute those instructions, thereby performing one or more processes defined by those instructions. Further, programs that implement such methods and algorithms may be stored and transmitted using a variety of media, for e.g., computer readable media in a number of manners. In some embodiments, hard-wired circuitry or custom hardware may be used in place of, or in combination with, software instructions for implementation of the processes of various embodiments. Thus, embodiments are not limited to any specific combination of hardware and software. A "processor" means any one or more microprocessors, Central Processing Unit (CPU) devices, computing devices, microcontrollers, digital signal processors, or like devices. The term "computer-readable medium" refers to any medium that participates in providing data (e.g., instructions) that may be read by a computer, a processor or a like device. Such a medium may take many forms, including but not limited to, non-volatile media, volatile media, and transmission media. Non-volatile media include, for example, optical or magnetic disks and other persistent memory volatile media include Dynamic Random Access Memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during Radio Frequency (RF) and Infrared (IR) data communications. Common forms of computer-readable media include, for example, a floppy disk, a flexible disk, hard disk, magnetic tape, any other magnetic medium, a Compact Disc-Read Only Memory (CD-ROM), Digital Versatile Disc (DVD), any other optical medium, punch cards, paper tape, any other physical medium with patterns of holes, a Random Access Memory (RAM), a Programmable Read Only Memory (PROM), an Erasable Programmable Read Only Memory (EPROM), an Electrically Erasable Programmable Read Only Memory (EEPROM), a flash memory, any other memory chip or cartridge, a carrier wave as described hereinafter, or any other medium from which a computer can read. In general, the computer-readable programs may be implemented in any programming language. Some examples of languages that can be used include C, C++, C#, or JAVA. The software programs may be stored on or in one or more mediums as object code. A computer program product comprising computer executable instructions embodied in a computer-readable medium comprises computer parsable codes for the implementation of the processes of various embodiments.

Where databases are described, such as the POS tagger database 103 and the database 109 of EPS sets, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, Local Area Network (LAN), Wide Area Network (WAN) or Ethernet, Token Ring, or via any appropriate communications means or combination of communications means. Each of the devices may comprise computers, such as those based on the Intel® processors, AMD® processors, Sun® processors, IBM® processors etc., that are adapted to communicate with the computer. Any number and type of machines may be in communication with the computer.

The foregoing examples have been provided merely for the purpose of explanation and are in no way to be construed as limiting of the present method and system disclosed herein. While the invention has been described with reference to various embodiments, it is understood that the words, which have been used herein, are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspect.

I claim:

1. A computer implemented method of generating declared patterns from components of a sentence, wherein each of said declared patterns is a sequence of pattern units, wherein each of said pattern units corresponds to a portion of text in said sentence, comprising:
   providing a computer-readable memory tangibly embodying said method as a computer program, wherein execution of the computer program in a computer comprising one or more processors is configured to:
      providing a conceptionary, wherein said conceptionary is a knowledge representation of items, wherein said items represent concepts, instances, relationships, characteristics, values, units of measure, and sets and aggregations of the items; providing a parts of speech tagger database;
      providing a first dictionary comprising dictionary entries of words and phrases, wherein said first dictionary further comprises declared categories and emergent categories, further wherein each of said dictionary entries is a term composed of single words and phrases and specifies individual senses of said term;
      providing a database of equivalent pattern specification sets for a given language, wherein said equivalent pattern specification sets represent different ways of saying the same thing in said given language;
      providing a second dictionary in a target language comprising an equivalent name set for each sense of a word, wherein said equivalent name set is a set of terms that are semantically close in meaning;
      for each sentence in a document corpus;
         tagging parts of speech in the sentence for identifying parts of speech of each word and phrase in the sentence;
         chunking the sentence using said identified parts of speech of each word and phrase to generate pattern units;
         identifying grammatical roles and senses of said generated pattern units by applying said first dictionary and said database of equivalent pattern specification sets;
         identifying an equivalent name set for each of the generated pattern units by applying said second dictionary and the conceptionary; and
         generating the declared patterns for the sentence using said identified equivalent name set for each of the generated pattern units.

2. The computer implemented method of claim 1, further comprising the steps of:
   obtaining an equivalent name set for each of the generated pattern units and determining whether or not a matching semantic item with said equivalent name set exists for the given language in the conceptionary;
   creating a new semantic item representing each of the generated pattern units if said matching semantic item does not exist for a pattern unit; and adding said new semantic item to the conceptionary;
   relating the new semantic item to other semantic items in the conceptionary via relationships indicated between the generated pattern units in the declared patterns; and adding a semantic item to the conceptionary referencing the identified equivalent name set for each said pattern unit, if the identified equivalent name set is not already referenced in the conceptionary.

3. The computer implemented method of claim 1, wherein said step of identifying said grammatical roles and said senses of the generated pattern units, comprises the steps of:
   finding an equivalent pattern specification set that maps to said chunked sentence; generating pattern units with valid grammatical roles from said equivalent pattern specification set;
   determining valid senses for each of said generated pattern units; obtaining pattern units with said valid senses; and converting said obtained pattern units with the valid senses to the declared patterns.

4. The computer implemented method of claim 3, wherein said step of determining the valid senses for each of the generated pattern units, comprises the steps of:
   providing an extended dictionary with a parts of speech for each of the senses; looking up the valid senses for each of the generated pattern units based on terms and parts of speech using said extended dictionary;
   obtaining senses for said terms; determining valid pair wise sense mapping for the generated pattern units using the first dictionary; and obtaining pattern units with valid senses and eliminating pattern units where no said valid pair wise sense mapping exists.

5. The computer implemented method of claim 4, wherein said step of determining the valid pair wise sense mapping for the generated pattern units, comprises the steps of:
   determining a correspondence function representing a pair of grammatical roles, for each sense of each entry in the extended dictionary;
   obtaining pattern unit pairs with said correspondence function which are pairings for a possible valid sense;
   identifying an emergent category for said possible valid sense of each of said pattern unit pairs;
   obtaining pattern unit pairs with said emergent category based on the correspondence function; and eliminating one or more of said obtained pattern unit pairs whose emergent category does not have the correspondence function, to finally obtain valid pattern unit pairs.

6. The computer implemented method of claim 1, further comprising a step of constructing an equivalent name set for a term in absence of said equivalent name set for said term in said second dictionary, wherein said construction of the equivalent name set of the term comprises the steps of:
   providing an extended dictionary with senses, wherein each of said senses has synonyms;
   looking up dictionary entry for the term in said extended dictionary with the senses and identifying dictionary entries corresponding to said synonyms of said senses of the term;
   identifying senses of each of the synonyms from the extended dictionary with the senses; and
   adding said identified senses to the equivalent name set of the senses of the term whose equivalent name set is being constructed, if identified senses are equal to the term.

7. The computer implemented method of claim 1, wherein each of said individual senses identifies membership in said declared categories.

8. The computer implemented method of claim 1, wherein said each sense of said word is an entry in the equivalent name set.

9. A computer implemented system for generating declared patterns from components of a sentence in a document corpus, wherein each of said declared patterns is a sequence of pattern units, wherein each of said pattern units corresponds to a portion of text in said sentence, comprising:
   a computer comprising one or more processors; and
   a storage device comprising a computer-readable medium in communication with said processors, said computer-readable medium storing instructions adapted to be executed by the processors, causing said computer to implement:
      a parts of speech tagger for tagging parts of speech in the sentence to identify parts of speech of each word and phrase in the sentence iteratively;
      a sentence chunker for chunking said parts of speech tagged sentence, wherein said chunked sentence is called a pattern unit;
      a first identification module for identifying grammatical roles and senses for each said pattern unit using a first dictionary with declared categories and emergent categories and a database of equivalent pattern specification sets, wherein each dictionary entry in said first dictionary specifies senses of the words and phrases, wherein each of said equivalent pattern specification sets is a set of equivalent pattern specifications, that for a given language, represent different ways of saying the same thing;
      a second identification module for identifying an equivalent name set for each said pattern unit using a conceptionary and a second dictionary comprising an equivalent name set for each sense of a word; and
      a pattern generator for generating the declared patterns for the sentence using said identified equivalent name set.

10. The computer implemented system of claim 9, wherein said conceptionary is updated by adding a semantic item to the conceptionary referencing the identified equivalent name set for each pattern unit, if the identified equivalent name set is not previously referenced in the conceptionary.

11. The computer implemented system of claim 9, wherein automatically generated declared patterns are used for matching declared patterns to said document corpus to determine which documents contain sentences that match the declared patterns and providing said documents as information of interest to a user.

12. A computer program product comprising computer executable instructions embodied in a non-transitory computer-readable medium, wherein said computer program product comprises:
   a first computer parsable program code for tagging parts of speech in a sentence to identify said parts of speech of each word and phrase in said sentence;
   a second computer parsable program code for chunking the sentence using said identified parts of speech of each word and phrase to generate pattern units;
   a third computer parsable program code for identifying grammatical roles and senses of said generated pattern units by applying a first dictionary and a database of equivalent pattern specification sets;
   a fourth computer parsable program code for identifying an equivalent name set for each of the generated pattern units by applying a second dictionary and a conceptionary; and
   a fifth computer parsable program code for generating declared patterns for the sentence using said identified equivalent name set for each of the generated pattern units.

* * * * *